(12) United States Patent
Oztaskent et al.

(10) Patent No.: US 11,941,416 B2
(45) Date of Patent: Mar. 26, 2024

(54) PLATFORM INDEPENDENT LIGHTWEIGHT USER INTERFACE FRAMEWORK FOR GLANCEABLE SURFACES

(71) Applicant: Google LLC, Mountain View, CA (US)

(72) Inventors: Ant Oztaskent, London (GB); Flavio Lerda, London (GB); John S. Evans, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/006,352

(22) PCT Filed: Jul. 26, 2021

(86) PCT No.: PCT/US2021/043191
§ 371 (c)(1),
(2) Date: Jan. 20, 2023

(87) PCT Pub. No.: WO2022/026394
PCT Pub. Date: Feb. 3, 2022

(65) Prior Publication Data
US 2023/0315494 A1 Oct. 5, 2023

Related U.S. Application Data

(60) Provisional application No. 63/059,793, filed on Jul. 31, 2020.

(51) Int. Cl.
*G06F 17/00* (2019.01)
*G06F 3/04842* (2022.01)
*G06F 9/451* (2018.01)

(52) U.S. Cl.
CPC .......... *G06F 9/451* (2018.02); *G06F 3/04842* (2013.01)

(58) Field of Classification Search
CPC .... G06F 9/451; G06F 3/04842; G06F 1/3206; G06F 1/3293; Y02D 10/00
See application file for complete search history.

(56) References Cited

U.S. PATENT DOCUMENTS 8,826,158 B1 * 9/2014 Blair ................... G06F 9/451
715/744
9,032,321 B1 * 5/2015 Cohen ................. G06F 3/0488
715/771

(Continued)

FOREIGN PATENT DOCUMENTS

CN 104471532 A * 3/2015 ........... G06F 3/0481
GB 2517838 A * 3/2015 ........... G06F 1/3206

(Continued)

OTHER PUBLICATIONS

Alvi, Ali, "Microsoft Band and Microsoft Health introduces Web Tiles and Microsoft Health Cloud APIs" Windows Blogs, Jul. 9, 2015, 5 pp.

(Continued)

*Primary Examiner* — Laurie A Ries
(74) *Attorney, Agent, or Firm* — Shumaker & Sieffert, P.A.

(57) ABSTRACT

One or more processors of a mobile computing device may receive, from a view provider, graphical user interface (GUI) view data that specifies, for each respective GUI view of a set of GUI views, a respective platform-neutral layout description and a respective one or more condition for the respective GUI view to be a relevant GUI view. The one or more processors may determine a GUI view as the relevant GUI view out of the set of GUI views based at least in part on one or more conditions for the GUI view specified by the GUI view data. The one or more processors may, in response to determining the GUI view as the relevant GUI view, output, based at least in part on a platform-neutral layout (Continued)

description for the GUI view specified by the GUI view data, the GUI view for display at a display device.

20 Claims, 4 Drawing Sheets

(56) References Cited

U.S. PATENT DOCUMENTS

| | | | |
|---|---|---|---|
| 9,753,527 B2* | 9/2017 | Connell | G06T 1/20 |
| 10,140,100 B2 | 11/2018 | Barnes et al. | |
| 10,620,920 B2* | 4/2020 | Hills | H04L 51/224 |
| 11,036,349 B2* | 6/2021 | Dykan | G06F 8/38 |
| 11,526,563 B2* | 12/2022 | Campbell | G06F 3/04842 |
| 2008/0244394 A1* | 10/2008 | Boyer | G06F 9/451 |
| | | | 715/700 |
| 2008/0307330 A1* | 12/2008 | Louch | G06F 3/0483 |
| | | | 715/763 |
| 2015/0026607 A1* | 1/2015 | Rapoport | G06F 9/451 |
| | | | 715/762 |
| 2017/0235466 A1* | 8/2017 | Tanwir | G06F 3/0481 |
| | | | 715/738 |
| 2017/0331901 A1 | 11/2017 | Sarlandie de la Robertie et al. | |
| 2018/0121060 A1* | 5/2018 | Jeong | G06F 3/0488 |
| 2020/0106853 A1 | 4/2020 | Steffen et al. | |
| 2020/0348951 A1* | 11/2020 | Zohar | G06F 16/972 |
| 2020/0363775 A1* | 11/2020 | Bhargava | G06F 21/6254 |
| 2023/0245247 A1* | 8/2023 | Xiong | G06Q 20/3678 |
| | | | 705/69 |

FOREIGN PATENT DOCUMENTS

| | | | | |
|---|---|---|---|---|
| GB | 2517838 A | 3/2015 | | |
| WO | 2019214475 A1 | 11/2019 | | |
| WO | WO-2019214475 A1 * | 11/2019 | ......... | G06F 9/44578 |

OTHER PUBLICATIONS

Guimbretiere Francois Francois et al., "An asymmetric dual-processor architecture for low-power information appliances," ACM Transactions on Embedded Computing Systems, vol. 13, No. 4, Mar. 10, 2014, 19 pp.

International Search Report and Written Opinion of International Application No. PCT/US2021/043191, dated Nov. 3, 2021, 16 pp.

Xu, et al., "UIWear. Easily Adapting User Interfaces for Wearable Devices" 2017 MobiCom conference, Oct. 16-20, 2017, 14 pp.

International Preliminary Report on Patentability from International Application No. PCT/US2021/043191 dated Feb. 9, 2023, 12 pp.

Response to Office Action dated Jul. 20, 2023, from counterpart Indian Application No. 202347006724 filed Oct. 16, 2023, 19 pp.

First Examination Report from counterpart Indian Application No. 202347006724 dated Jul. 20, 2023, 9 pp.

Response to Office Action dated Feb. 8, 2023, from counterpart Application No. 21756127.3 filed Aug. 14, 2023, 31 pp.

\* cited by examiner

PLATFORM INDEPENDENT LIGHTWEIGHT USER INTERFACE FRAMEWORK FOR GLANCEABLE SURFACES

RELATED APPLICATIONS

This application claims priority to U.S. Provisional Application No. 63/059,793, filed Jul. 31, 2020, the entire contents of which is hereby incorporated by reference.

BACKGROUND

One characteristic of a mobile or wearable device is the device's operational use time, i.e. the duration for which the device may be continuously used as a function of the device's stored energy (e.g. battery) capacity. Most mobile or wearable devices are designed with a main processor that selectively configures various sensors and radios of the mobile to reduce power usages when those sensors or radios are not otherwise in use by the device. Some devices include a second, lower power processor in addition to the relatively higher power main processor. To reduce power usage, such devices may power off the higher power main processor and, instead, operate using the lower power processor. Such lower power processors typically provide a reduced set of functionality as compared to the higher power main processor. Switching between using a higher power main processor and a lower power processor may cause a delay when the user first looks at the display and when the display shows information, as the device may first need to power on the higher power processor and then render the user interface before the information can be displayed.

SUMMARY

The present disclosure is directed to techniques for enabling mobile or wearable computing devices with both lower power and higher power processors to provide functionality that previously required the higher power processor to be provided using the lower power processor with the higher power processor powered off. The lower power processor may be designed to reduce the amount of power consumed by using fewer transistors, by using a smaller memory cache, and/or by using a simpler microarchitecture compared with the higher power processor. While the higher power processor can execute a full featured mobile operating system, the lower power processor may not have sufficient processing capabilities to execute the full featured mobile operating system. Instead, the device may be configured such that the lower power processor may execute a reduced feature version of the mobile operating system (e.g., a microkernel) the provides basic user interface, display, and data management functionality but may not provide network access functionality. In various instances, the reduced feature version of the mobile operating system may not provide sufficient features to execute applications or other program code designed to be executing using the full featured mobile operating system and the higher power processor.

Aspects of this disclosure disclose techniques that enable mobile computing devices that include a lower power processor to execute a renderer at the lower power processor to generate a GUI view. To generate a GUI view, the mobile computing device may send a request to a provider for GUI view data and may receive, from the provider, the requested GUI view data. A renderer that executes on the lower power processor may process the GUI view data received from the provider to generate the GUI view and to output the GUI view for display at a display device of the mobile computing device.

In one aspect, the provider may generate the GUI view data as structured data that includes platform-neutral layout descriptions for drawing the layout of each of a set of GUI view, and the renderer executing on the lower power processor may be able to translate the platform-neutral layout description of a GUI view to native instructions for drawing the layout of the GUI view that are supported by the lower power processor. In another aspect, the renderer may receive timeline data from the provider that may allow the lower power processor to determine that another GUI view that has become a relevant GUI view and to output the other GUI view for display at the display device without having to communicate with the provider. That is, the lower power processor may periodically determine, based on the timeline data received by the mobile computing device, a relevant GUI view based on contextual information, and may output the determined relevant GUI view for display at the display device.

In another aspect, the GUI view data may not necessarily include one or more resources along with the layout description for drawing the layout of a GUI view. As such, the GUI view data may include the layout description without also including one or more resources that are to be included in the GUI view. Instead, the mobile computing device may send a request for one or more resources to be included in the GUI view separate from the request for GUI view data.

In one example, a method includes receiving, by one or more processors of a mobile computing device from a view provider, graphical user interface (GUI) view data that specifies, for each respective GUI view of a set of GUI views, a respective platform-neutral layout description and a respective one or more condition for the respective GUI view to be a relevant GUI view; determining, by the one or more processors, a GUI view as the relevant GUI view out of the set of GUI views based at least in part on one or more conditions for the GUI view specified by the GUI view data; and in response to determining the GUI view as the relevant GUI view, outputting, by the one or more processors and based at least in part on a platform-neutral layout description for the GUI view specified by the GUI view data, the GUI view for display at a display device.

In one example, a mobile computing device includes at least one processor. The mobile computing device further includes a computer-readable storage device configured to store instructions that are executable by the at least one processor to: receive, from a view provider, graphical user interface (GUI) view data that specifies, for each respective GUI view of a set of GUI views, a respective platform-neutral layout description and a respective one or more condition for the respective GUI view to be a relevant GUI view; determine a GUI view as the relevant GUI view out of the set of GUI views based at least in part on one or more conditions for the GUI view specified by the GUI view data; and in response to determining the GUI view as the relevant GUI view, output, based at least in part on a platform-neutral layout description for the GUI view specified by the GUI view data, the GUI view for display at a display device.

In one example, a computer-readable storage medium having stored thereon instructions that, when executed, cause one or more processors to: receive, from a view provider, graphical user interface (GUI) view data that specifies, for each respective GUI view of a set of GUI views, a respective platform-neutral layout description and a respective one or more condition for the respective GUI view to be a relevant GUI view; determine a GUI view as the relevant GUI view out of the set of GUI views based at least in part on one or more conditions for the GUI view specified by the GUI view data; and in response to determining the GUI view as the relevant GUI view, output, based at least in part on a platform-neutral layout description for the GUI view specified by the GUI view data, the GUI view for display at a display device.

The details of one or more examples are set forth in the accompanying drawings and the description below. Other features, objects, and advantages of the disclosure will be apparent from the description and drawings, and from the claims.

DETAILED DESCRIPTION

Figure 1:
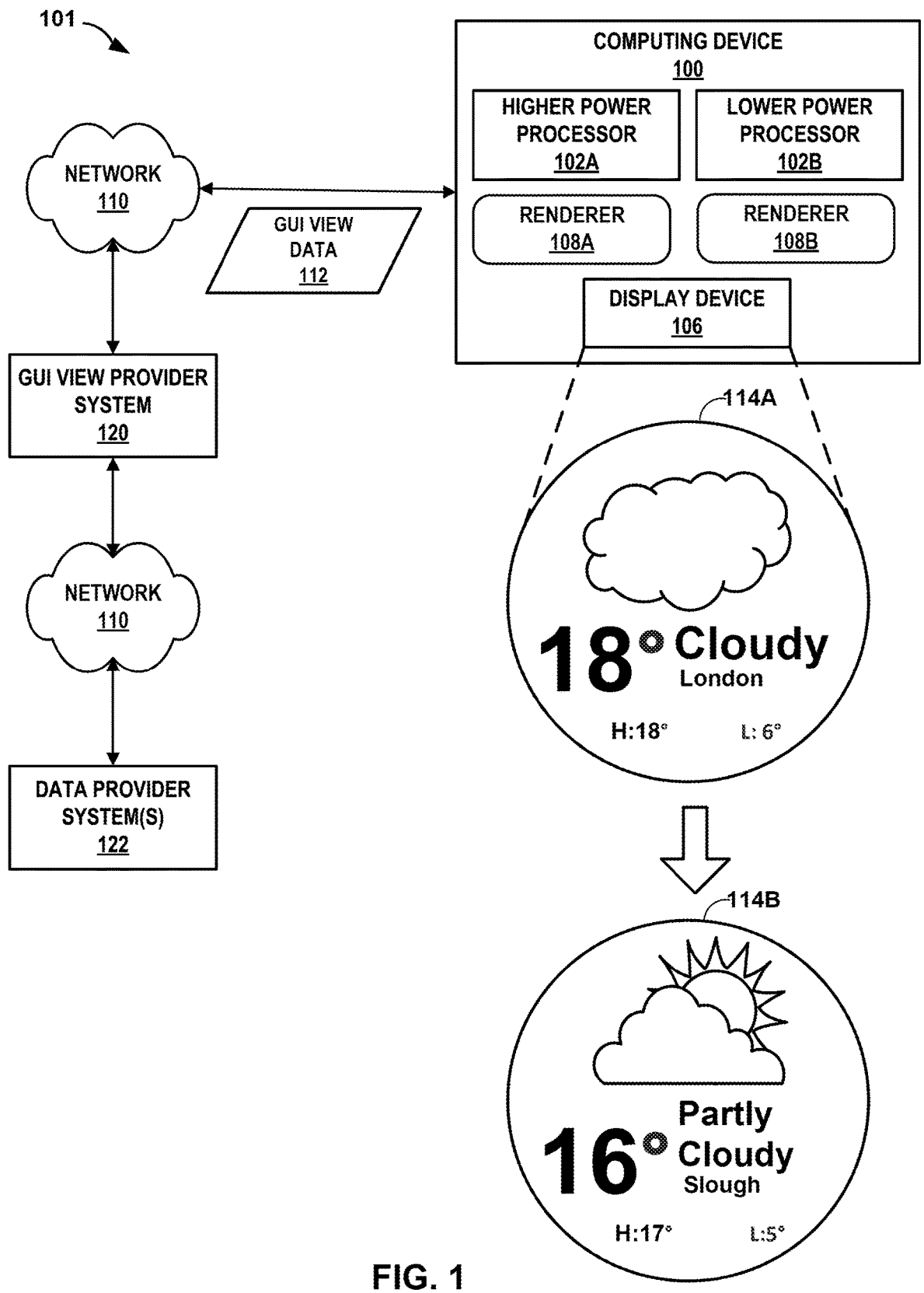
FIG. 1 is a conceptual diagram illustrating an example system for providing a platform independent lightweight user interface framework, in accordance with one or more aspects of the present disclosure.

In general, this disclosure is directed to techniques for enabling mobile or wearable computing devices with both lower power and higher power processors to provide functionality that previously required the higher power processor to be provided using the lower power processor with the higher power processor powered off. One functionality of a computing device is to output a graphical user interface (GUI) view that is tailored for specific functions. A GUI view may be designed as a glanceable surface that provides information and functionalities in a way that a user can quickly glance at in order to view the information contained within the GUI view. For example, a GUI view may include information regarding the current weather, public transportation information, meeting reminders, fitness tracking functionalities, and the like. Such a glanceable surface may be useful when displayed by a relatively small display device, such as the display device of a wearable computing device such as a smart watch.

To generate a GUI view, a computing device may communicate with a provider to request GUI view data that the computing device may use to render the GUI view. The provider, which may be a cloud-based remote system, may, in response to receiving the request for GUI view data, generate the GUI view data and send the GUI view data to the computing device. The computing device may receive the GUI view data from the provider and may process the GUI view data to render a GUI view.

The provider may generate GUI view data in the form of a sequence of platform-specific instructions for drawing the GUI view or in the form of platform-specific layout descriptions for drawing the layout of the GUI view that are specific to the platform of the requesting computing device. That is, the provider may generate GUI view data that includes native application programming interface (API) calls of the mobile operating system running on the computing device. Further, the provider may bundle, in the GUI view data, resources, such as images, that are to be included in the GUI view that is to be rendered by the computing device. Thus, to generate a GUI view, the computing device may simply execute the platform-specific instructions or platform-specific layout descriptions to render the GUI view that includes the resources bundled in the GUI view data. The computing device may also periodically refresh the GUI view to render updated versions of the GUI view. To refresh the GUI view, the computing device may periodically communicate with the renderer to request and receive updated GUI view data that the computing device may process to render updated versions of the GUI view.

However, as described above, while the higher power processor can execute a full featured mobile operating system, the lower power processor may not have sufficient processing capabilities to execute the full featured mobile operating system. As such, the lower power processor may not be able to execute such sequences of platform-specific instructions for drawing the GUI view or the platform-specific layout descriptions for drawing the layout of the GUI view that are specific to the platform of the requesting computing device because the lower power processor may not support all of the native API calls of the mobile operating system running on the higher power processor. Further, because the lower power processor may have a much smaller cache compared with the higher power processor, the lower power processor may not be able to store all of the resources bundled in the GUI view data.

In addition, the lower power processor may lack the functionality to interface with one or more communication units (e.g., network interfaces) of the computing device in order to communicate with the provider over a network to receive updated GUI view data. Instead, the lower power processor may use the higher power processor as a proxy for communicating with the provider over a network. Thus, in order for the lower power processor to receive updated GUI view data from the provider, the computing device may have to power on the higher power processor in order to communicate with the provider over a network.

Techniques of this disclosure potentially solve the problems described above regarding using a lower power processor to render GUI views by providing a platform-neutral and programming language-neutral user interface framework having application programming interfaces (APIs) that are defined by an extensible mechanism for serializing structured data. Instead of generating GUI view data as a sequence of platform-specific instructions for drawing the GUI view or in the form of platform-specific (e.g., cross-platform) layout descriptions for drawing the layout of the GUI view that are specific to the platform of the requesting computing device, aspects of this disclosure describe a provider that uses such an user interface framework generate GUI view data as structured data that includes platform-neutral layout descriptions for drawing the layout of a GUI view that the provider serializes and sends to computing devices.

A computing device may include a renderer that can be executed by a higher power processor and/or a lower power processor to process the GUI view data that includes platform-neutral layout description for drawing the layout of the GUI view and to generate, from the GUI view data, platform-specific (e.g., native) instructions for generating and outputting the GUI view, and the computing device may therefore execute such platform-specific instructions to output the GUI for display at a display device.

By generating GUI view data as structured data that includes platform-neutral layout descriptions for drawing the layout of a GUI view, aspects of the present disclosure may enable the provider to generate GUI view data that can be processed by both higher power processors and lower power processors running different operating systems on different mobile computing platforms to generate GUI views. A renderer that executes on a lower power processor may be able to process such platform-neutral layout descriptions included in the GUI view data to generate instructions for drawing the GUI view that are native to the lower power processor, and the lower power processor is able to execute such native instructions to generate the GUI view and to output the GUI view for display at a display device. In this way, the user interface framework enables both lower power processors and higher power processors across different platforms and running different operating systems to render GUI views from the same set of GUI view data generated by a provider.

In addition, the techniques of this disclosure may reduce the amount of network communications between a provider that provides GUI view data to a computing device and the computing device that renders a GUI view by caching GUI view data associated with a set of GUI views and by outputting an updated GUI view from the set of GUI views based on one or more conditions. To that end, the provider may generate GUI view data that specifies the layouts of a set of GUI views and a timeline that defines one or more conditions for outputting an updated GUI view. The renderer executing at the computing device may receive the GUI view data that specifies the layouts of a set of GUI views and a timeline that defines one or more conditions for outputting an updated GUI view and may cache the set of GUI views specified by the GUI view data. In some examples, the timeline may enable the computing device to output an updated GUI view without a network connection if the computing device outputs an updated GUI view that is cached in the computing device.

The renderer executing at the computing device may periodically determine whether to replace a GUI view being outputted with a GUI view from the set of GUI views cached by the computing device based on the one or more conditions defined by the timeline. When the renderer determines, based on the timeline, that one or more conditions have been met for replacing a GUI view being outputted with a GUI view selected from the set of GUI views cached by the computing device, the renderer may output the selected GUI view. As such, instead of communicating with the renderer via a network to request and receive updated GUI view data in order to output an updated GUI view, the computing device may be able to output an updated GUI view without communicating with the provider over the network. In this way, the techniques of this disclosure reduce the number of times that computing device may have to power on the higher power processor in order to communicate with the provider over a network, thereby reducing the power consumed by the computing device to update GUI views.

The techniques of this disclosure may further support the use of lower power processors that have relatively small amounts of cache memory to render GUI views by reducing the size of GUI view data generated by a provider and sent to renderers. Instead of bundling resources together with layout description in GUI view data that a provider sends to a renderer, a renderer may separately request and receive resources apart from the layout description included in GUI view data, such as by using separate API calls to separately request the layout description and the resources. Instead of sending GUI view data that includes a layout description of a GUI view and resources that are to be included in the GUI view, a provider may generate and send GUI view data that includes a layout description of a GUI view without necessarily including the resources that are to be included in the GUI view.

Instead, when a renderer executes on a lower power processor of a computing device to render a GUI view, the renderer may determine whether resources to be included in the GUI view are already cached at the computing device. If the renderer determines that such resources are not cached at the computing device, the renderer may send a separate request to the provider for such resources that are to be included in the GUI view. For example, if the GUI view includes a plurality of resources, the renderer may send a separate request for each of the plurality of resources.

By sending a request for resources separately from a request for GUI view data that includes a layout description of one or more GUI view, the techniques of this disclosure reduces the amount of resources that are to be stored by such lower power processors in the cache memory by retrieving resources that are to be included in a GUI view from the provider as such resources are needed, such as when the GUI view is to be outputted for display, instead of storing a large set of resources in memory, thereby enabling lower power processors with relatively small amounts of cache memory to be able to render GUI views that includes resources.

For example, the renderer may separately request each of a plurality of resources in a GUI view so that the render. For a GUI view that includes two resources, the renderer may request a first resource, store the first resource in cache memory, output the first resource (e.g., via direct memory access to a screen buffer), and then delete the first resource from the cache memory so that there is available space in the cache memory for the second resource of the GUI view. The renderer may therefore request the second resource, store the second resource in cache memory, and output the second resource to complete rendering of the GUI view.

FIG. 1 is a conceptual diagram illustrating an example system 101 for providing a platform independent lightweight user interface framework, in accordance with one or more aspects of the present disclosure. As shown in FIG. 1, system 101 may include mobile computing device 100 configured to communicate with GUI view provider system 120 via network 110 to generate graphical user interface (GUI) views that mobile computing device 100 may display at display device 106.

Examples of mobile computing device 100 may include, but are not limited to, a mobile phone, a tablet computer, a personal digital assistant (PDA), a portable gaming device, a portable media player, a wearable computing device (e.g., a watch, a wrist-mounted computing device, a head-mounted computing device), a smart thermostat device, a smart display device, or other type of computing device.

Mobile computing device 100 includes display device 106 (e.g., a presence-sensitive display device). Display device 106 may function as an input device and/or an output device for mobile computing device 100. Display device 106 may be implemented using various technologies. For instance, display device 106 may function as an input device using a presence-sensitive input device, such as a resistive touchscreen, a surface acoustic wave touchscreen, a capacitive touchscreen, a projective capacitance touchscreen, a presence-sensitive screen, an acoustic pulse recognition touchscreen, a presence-sensitive screen that detects motion via radar technology, or another presence-sensitive technology. Display device 106 may function as an output device using any of one or more display devices, such as a liquid crystal display (LCD), dot matrix display, light emitting diode (LED) display, micro light-emitting diode (microLED) display, organic light-emitting diode (OLED) display, active matrix OLED (AMOLED) display, e-ink, or similar monochrome or color display capable of outputting visible information to users of mobile computing devices 100.

Figure 2:
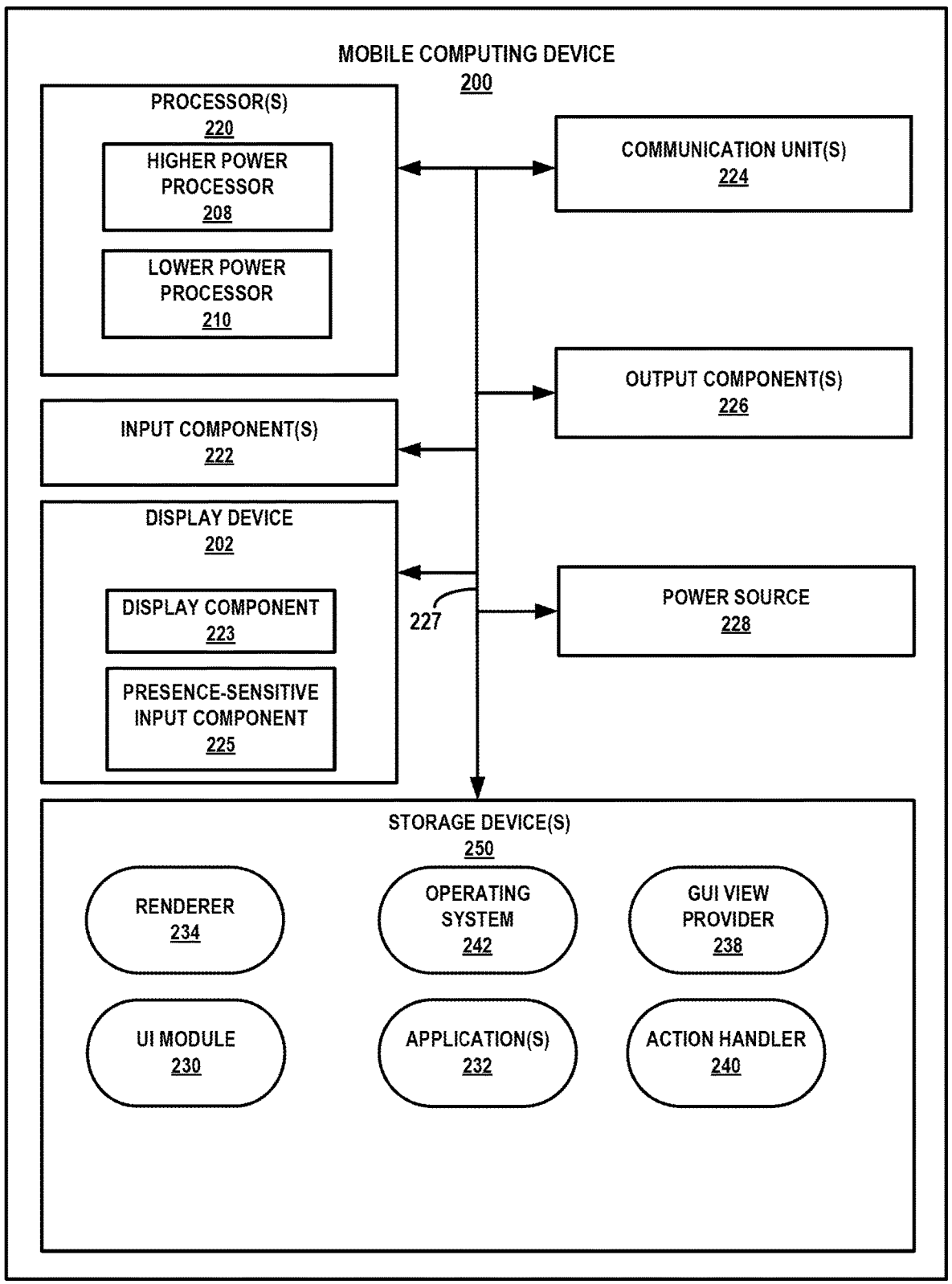
FIG. 2 is a block diagram illustrating an example mobile computing device, in accordance with one or more aspects of the present disclosure.

In some examples, mobile computing device 100 may include one or more communication units (such as shown in FIG. 2). These communication units may send data to and/or receive data from one or more other computing devices. In some examples, the communication units support wireless and/or wired communication, and they may send and/or receive data using any variety of communication protocols.

Users may actively interact with mobile computing devices 100 over time. Mobile computing devices 100 may provide one or more interaction modes with which the user may interact with mobile computing devices 100. In many cases, the user may perform one or more gestures or otherwise provide user input in order to interact with mobile computing device 100.

In some examples, a user may interact with mobile computing device 100 by providing user input that causes mobile computing device 100 to output graphical user interfaces (GUI) views for display at display device 106 that is tailored for specific functions. For example, a user may perform a swipe gesture, a tap gesture, and the like to cause a mobile computing device to output a GUI view at a display device, or to cause the mobile computing device to switch from outputting a GUI view at the display device to outputting a different GUI view at the display device.

As used herein, the term "GUI view" refers to a discrete UI screen, layer, page, tile, window, or a portion of related content of a GUI, and may also be referred to as tiles, widgets, complications, overlays, assistant responses, watch faces, and the like. In some examples, only one GUI view may be displayed at a time. In other examples, more than one GUI view may be displayed at a time. A grouping of GUI views may represent a single GUI.

In some examples, a GUI view may refer to a glanceable surface. That is, the GUI view may be a UI that provides information and functionalities that are displayed by display device 106 in a way that a user can quickly glance at in order to view the information contained within the GUI view. For example, such GUI views may include a GUI view that provides weather information, a GUI view that provides fitness tracking functionalities, a GUI view that provides virtual assistant functionalities, a GUI view that provides calendaring functionalities, a GUI view that provides public transportation information, and the like.

GUI views may be useful in the context of wearable computing devices, such as smart watches, or other mobile computing devices with relatively small (e.g., two inches or less) displays in which the amount of information that can be displayed by the display is relatively small. The information and functionalities provided by GUI views may be context-specific. For example, a GUI view may provide weather information for the current location of mobile computing device 100, and may change the weather information provided when the location of mobile computing device 100 changes to a new location. Similarly, mobile computing device 100A may output for display different GUI views depending on the context. For example, mobile computing device 100A may output for display a GUI view that provides a meeting reminder 30 minutes before a scheduled meeting and may switch to outputting for display a GUI view of a grocery shopping list when mobile computing device 100A is located near the vicinity of a supermarket.

Mobile computing device 100 may include one or more processors. For example, mobile computing devices 100 may include both a "big" processor that includes one or more relatively higher-powered processing cores for performing processing-intensive workloads and a "little" processor that includes one or more lower power processing cores for performing relatively less processing-intensive workloads. A "little" processor may consume relatively less power compared with a "big" processor and may have relatively lower performance compared with the "big" processor. To achieve such a reduction in power consumption, a "little" processor may use relatively fewer transistors, have a smaller memory cache, operate at a lower operating frequency, and/or have a simpler microarchitecture compared with the "big" processor, and therefore may have relatively lower performance compared with the "big" processor. In some examples, the "big" processor and the "little" processor may be part of a "big.LITTLE" heterogeneous architecture.

Mobile computing device 100 includes higher power processor 102A, which is a "big" processor having relatively higher performance and also includes lower power processor 102B, which is a "little" processor having relatively lower performance. A mobile computing device may include both a "big" processor and a "little" processor, include only a "big" processor, or only a "little" processor. In the example of FIG. 1, while mobile computing device 100 includes both higher power processor 102A (e.g., a "big" processor) and a lower power processor 102B (e.g., a "little" processor), other mobile computing devices may include a higher power processor without also including a lower power processor, or may include a lower power processor without also including a higher power processor. For example, higher power processor 102A may be a Cortex-A class "application" processor and lower power processor 102B may be a Cortex-M class "embedded" processor.

While the present disclosure describes mobile computing device 100 as including higher power processor 102A and lower power processor 102B, the description of higher power processor 102A using the term "higher power" does not imply that higher power processor 102A is a desktop-class or server-class processor. Instead, higher power processor 102A is a mobile-class processor designed for mobile computing devices such as mobile phones, wearable computing devices, and the like, that is relatively higher-powered compared with lower power processor 102B.

Lower power processor 102B may have limited functionality compared with higher power processor 102A. In some examples, lower power processor 102B may have a much smaller cache memory compared with higher power processor 102A, may operate at a lower operating frequency compared with higher power processor 102A, may have a relatively lower instructions per cycle (IPC), may not be able to use network interfaces of mobile computing device 100 to establish network connections to send and receive data with other computing devices, and the like. Higher power processor 102A may have a much larger cache memory compared with lower power processor 102B, may operate at a higher operating frequency compared with lower power processor 102B, may have a relatively higher IPC, and/or may have micro-architectural features that enable relatively more performance compared with lower power processor 102B but at the cost of additional power consumption.

In some examples, higher power processor 102A may be configured to execute a fully-featured mobile operating system, such as an operating system designed for a mobile phone or a wearable device, while lower power processor 102B may not be able to execute such a fully-featured mobile operating system. Instead, lower power processor 102B may be configured to execute a much more limited operating system having limited functionality with a limited number of APIs compared with the fully-featured mobile operating system that higher power processor 102A may be configured to execute. Thus, while higher power processor 102A is able to execute instructions that are native to the fully-featured mobile operating system, lower power processor 102B may not be able to execute instructions that are native to the fully-featured mobile operating system running on higher power processor 102A and may instead may be limited to executing a subset (i.e., less than all) of such instructions that are native to the fully-featured mobile operating system or may be limited to executing a different set of instructions.

Because higher power processor 102A is relatively higher-powered compared to lower power processor 102B, higher power processor 102A may consume relatively more power when powered on and operating compared with lower power processor 102B. As such, mobile computing device 100 may be able to reduce its power consumption by increasing the use of lower power processor 102B to perform workloads while reducing the use of higher power processor 102A.

As such, aspects of the present disclosure provide a platform independent lightweight user interface framework that enables mobile computing device 100 to use lower power processor 102B to generate GUI views, thereby reducing the power consumption of mobile computing device 100. Specifically, the platform independent lightweight user interface framework may be used by mobile computing devices that includes higher-power processors, lower-power processors, and/or a combination of higher-power processors and lower-power processors running different operating systems to generate GUI views using the same GUI view data.

In the example of FIG. 1, mobile computing device 100 is configured to send a request to GUI view provider system 120 for GUI view data. The request for GUI view data may specify the type of GUI view that mobile computing device 100 is to render, such as whether the GUI is to provide weather information, fitness tracking functionalities, virtual assistant functionalities, calendar functionalities, and the like. The request for GUI view data may also include one or more parameters, such as the current location of mobile computing device 100, the current time of the day, the activity being performed by the user of mobile computing device 100, and the like.

GUI view provider system 120 may-be a cloud-based system, a server-based system, or a companion mobile computing device (e.g., a smart phone that is paired to mobile computing device 100) that is configured to generate GUI view data according a platform independent user interface framework. GUI view provider system 120 may, in response to receiving the request from mobile computing device 100, generate GUI view data 112 based at least in part on the request. In some examples, to generate the GUI view data, GUI view provider system 120 may communicate with one or more data provider systems 122 via network 110 to request and receive information to be displayed in the GUI view. For example, if GUI view provider system 120 receives a request from mobile computing device 100 for GUI view data to generate a GUI view that provides weather information, GUI view provider system 120 may request and receive from a weather data provider system weather data for one or more locations, such as the current location of mobile computing device 100, predicted future locations of mobile computing device 100, and the like that are to be presented in the GUI view. In another example, if GUI view provider system 120 receives a request from mobile computing device 100 for GUI view data to generate a GUI view that provides calendar functionalities, GUI view provider system 120 may request and receive, from an enterprise server, information regarding the user of mobile computing device 100's meetings that day.

GUI view data, such as GUI view data 112, may be structured data that specifies the data to be presented in each of one or more GUI views. GUI view data 112 may, for each of one more GUI views, specify a UI layout that includes platform-neutral layout description of the layout of the GUI view, specify one or more actions associated with the GUI view, and specify one or more resources associated with the GUI view. The data to be presented in the GUI view, as described above, may be information received by GUI view provider system 120 from one or more data provider systems 122.

The UI layout specified by the GUI view data 112 for a GUI view may be platform-neutral layout description that declares the layout of the GUI view, such as the layout of text, images, widgets, controls, and the like, as well as the specific data (e.g., text) to be presented in the GUI view. In some examples, the UI layout is specified using a declarative model. GUI view data 112 may specify one or more GUI views, and the UI layout specified by the GUI view data 112 may declare the layout for each of the one or more GUI views. For example, if GUI view data 112 includes views of weather at different locations, GUI view data 112 may include a view that provides the weather for each of the different locations.

GUI view data 112 may also specify a timeline that defines conditions associated with the relevancy of each of the GUI views included in GUI view data 112. As discussed above, GUI view data 112 may include one or more GUI views, and each GUI view may be relevant under certain conditions. Such conditions may include time-based conditions, location-based conditions, user activity-based conditions, and the like. For example, each GUI view may be relevant (i.e., become a relevant GUI view) for a specific amount of time (e.g., 5 seconds, 15 seconds, 30 seconds, and the like). As such, in this example, the timeline may specify the amount of time that each GUI view is relevant. In another example, a meeting reminder GUI view may be relevant before the start of the meeting but may no longer be relevant once the meeting has started. In another example, a shopping list GUI view may be relevant when the mobile computing device is at a supermarket but may not be relevant at locations besides the supermarket. In another example, a news GUI view of the day's top headlines may be relevant at the time that the user of the mobile computing device has just woken up in the morning.

The one or more actions specified by GUI view data 112 may define, for each of the GUI views specified by GUI view data 112, one or more actions that may be performed by the GUI view, such as reloading the GUI view, launching a platform specific application on the mobile device, such as via accessing deep links to such applications, accessing a remote resource via the network (e.g., network 110), and the like. GUI view data 112 may specify, for an user interface element view, an associated action, so that when the user of the mobile computing device 100 interacts with the user interface element, the mobile computing device 100 may perform the action associated with the user interface element.

The one or more resources specified by GUI view data 112 for each of the GUI views specified by GUI view data 112 may include images, videos, audio files, and the like. To specify one or more resources, GUI view data 112 may include references to resources of native applications on the mobile computing device or may bundle raw resource data within the GUI view data 112. Bundling raw resource data within the GUI view data 112 may enable developers of GUI views to create GUI view data 112 that are not dependent upon native applications installed on the mobile computing device, such as native application installed from a platform-specific digital distribution platform (e.g., an app store).

GUI view provider system 120 may generate GUI view data 112 and serialize GUI view data 112 for sending to mobile computing device 100. While GUI view provider system 120 may be able to use any programming language to generate GUI view data 112, GUI view provider system 120 may generate GUI view data 112 that is language neutral and platform neutral, so that GUI view provider system 120 may be able to send the same GUI view data 112 generated by GUI view provider system 120 to different mobile computing devices running different operating systems.

GUI view provider system 120 may serialize the GUI view data 112 using any suitable data serializing protocol. In some examples, GUI view provider system 120 may serialize GUI view data 112 using protocol buffers, which is a language-neutral, platform-neutral, extensible mechanism for serializing structured data, thereby enabling GUI view provider system 120 to produce GUI view data 112 that is cross-platform and able to be processed by renderers running on different operating systems to generate GUI views based on the GUI view data 112.

In the example of FIG. 1, GUI view provider system 120 may, in response to receiving a request for GUI view data from mobile computing device 100, generate, serialize, and send GUI view data 112 to mobile computing device 100 via network 110. Mobile computing device 100 may, in response to receiving GUI view data 112 from GUI view provider system 120, render a GUI view based at least in part on GUI view data 112. To render a GUI view based at least in part on GUI view data 112, mobile computing device 100 may generate platform-specific instructions for generating the GUI view based at least in part on GUI view data 112, execute the platform-specific instructions to generate the GUI view, and output the GUI view for display at display device 106.

Mobile computing device 100 includes renderer 108A and renderer 108B for rendering a GUI view based at least in part on GUI view data (e.g., GUI view data 112) received from a GUI view provider, such as GUI view provider system 120. Renderer 108A and renderer 108B may be applications configured to process GUI view data 112 to generate platform-specific instructions (e.g., instructions native to mobile computing device 100) for generating the GUI view, such as platform-specific drawing commands, that mobile computing device 100 may execute to generate the GUI view that mobile computing device 100 may output for display at display device 106.

Because mobile computing device 100 includes both a higher power processor 102A and a lower power processor 102B, mobile computing device 100 may include renderer 108A that may be executed by higher power processor 102A to render a GUI view based at least in part on GUI view data 112 and may also include renderer 108B that may be executed by lower power processor 102B to render a GUI view based at least in part on GUI view data 112.

Mobile computing device 100 may be configured to select either higher power processor 102A or lower power processor 102B to render a GUI view based on GUI view data 112. Mobile computing device 100 may base the selection on factors such as the respective amount of power consumed by higher power processor 102A and lower power processor 102B to render a GUI view based at least in part on GUI view data 112. For example, if higher power processor 102A is already powered on, mobile computing device 100 may select higher power processor 102A to render GUI view based at least in part on GUI view data 112. Correspondingly, if higher power processor 102A is not already powered on, mobile computing device 100 may select lower power processor 102B to render GUI view based at least in part on GUI view data 112.

If mobile computing device 100 selects higher power processor 102A to render a GUI view, higher power processor 102A may be configured to execute renderer 108A to generate, based at least in part on GUI view data 112, platform-specific instructions that higher power processor 102A may execute to output the GUI view for display at display device 106. Similarly, if mobile computing device 100 selects lower power processor 102B to render a GUI view, lower power processor 102B may be configured to execute renderer 108B to generate, based at least in part on GUI view data 112, platform-specific instructions that lower power processor 102B may execute to output the GUI view for display at display device 106. Mobile computing device 100 may therefore output the generated GUI view for display at display device 106.

In the example of FIG. 1, lower power processor 102B may execute instructions to output GUI view 114A associated with weather information at display device 106. As can be seen, GUI view 114A displayed at display device 106 may include text, such as the current temperature (e.g., "18°"), cloud information (e.g., "cloudy"), the location associated with the weather information (e.g., "London"), the high temperature of the day (e.g., "18°"), the low temperature of the day (e.g., "6°"). GUI view 114A may also include resources, such as an image of a cloud to represent the cloudiness of the weather.

GUI view 114A may present one of a plurality of GUI view specified by GUI view data 112. When renderer 108B executes on lower power processor 102B to generate platform-specific instructions for rendering a GUI view (e.g., output the GUI view for display at display device 106), such as for rendering GUI view 114A, renderer 108B may also execute to generate platform-specific instructions for rendering each of the other GUI views in the set of GUI views specified by the GUI view data 112, and may cache the generated platform-specific instructions for rendering each of the set of GUI views, such as in memory of mobile computing device 100.

As GUI view 114A is outputted for display at display device 106, mobile computing device 100 may be configured to determine, based at least in part on the timeline specified by GUI view data 112, whether to output another GUI view from the set of GUI views specified by GUI view data 112. Mobile computing device 100 may determine to output another GUI view from the set of GUI views to replace GUI view 114A at display device 106, or may determine to output another GUI view from the set of GUI views for display at display device 106 alongside GUI view 114A.

Lower power processor 102B may continuously monitor contextual information associated with mobile computing device 100 and/or the surrounding environment, such as the amount of time the current GUI view has been outputted for display by display device 106, the current time, the current location, the activity currently being performed by the user of mobile computing device 300 and the like to determine whether to output another GUI view for display at display device 106. In some examples, the timeline specified by GUI view data 112 may associate one or more conditions with each of the set of GUI views specified by GUI view data 112. The one or more conditions associated with the set of GUI views may include conditions related to contextual information associated with mobile computing device 100 and/or the surrounding environment, such as the amount of time that an associated GUI view is to be outputted for display by display device 106, the current time, the current location, the activity currently being performed by the user of mobile computing device 300 and the like.

Lower power processor 102B may therefore compare the contextual information associated with mobile computing device 100 and/or the surrounding environment with the one or more conditions associated with each of the set of GUI views to determine a relevant GUI view out of the set of GUI views for the contextual information associated with mobile computing device 100 and/or the surrounding environment. Lower power processor 102B may therefore output the relevant GUI view for display at display device 106.

In some examples, if the timeline specifies an amount of time for which GUI view 114A is relevant, lower power processor 102B may execute or otherwise monitor a timer to monitor whether GUI view 114B is still relevant. If lower power processor 102B determines that GUI view 114A is no longer relevant, lower processor 102B may determine a relevant GUI view out of the set of GUI views and may output the relevant GUI view for display at display device 106.

In another example, if GUI view 114A provides a view for the weather at the current location, lower power processor 102B may monitor the location of mobile computing device 100. If lower power processor 102B determines that the location of mobile computing device 100 has changed to a new location, lower power processor 102B may determine that GUI view 114A currently provided by GUI view is no longer relevant. Lower power processor 102B may determine whether a GUI view of the weather associated with the new location has been cached and, if so, lower power processor 102B may output a GUI view of the weather of the current location of mobile computing device 100.

As shown in FIG. 1, if lower power processor 102B determines that mobile computing device 100 has moved from London to Slough, lower power processor 102B may determine that GUI view 114A that presents the weather in London is no longer relevant. Lower power processor 102B may determine whether a GUI view that presents the weather in Slough has been cached and, if so, lower power processor 102B may output GUI view 114B of the weather in Slough.

In some examples, to further support the use of lower power processors such as lower power processor 102B, mobile computing device 100 may be configured to separately request and receive UI layout data for a GUI view and resources for the GUI view. Because lower power processor 102B may include a very small amount of memory in the order of a few megabytes, lower power processor 102B may, in some cases, be unable to process GUI view data that includes large resources such as large bitmap images. As such, GUI view data 112 generated by GUI view provider system 120 and received by mobile computing device 100 may, for a GUI view, specify a UI layout, a timeline, one or more actions, and one or more resources, but may not include, for the GUI view, the one or more resources for the GUI view.

Instead of receiving resources as part of GUI view data 112, lower power processor 102B may be configured to separately request and receive resources associated with a GUI view (e.g., an image that is to be part of the GUI view) on-demand as lower power processor 102B prepares to output a view for display at display device 106. When lower power processor 102B is to execute instructions to output a GUI view for display at display device 106, mobile computing device 100 may be configured to determine whether resources to be included in the GUI view are currently cached at mobile computing device 100. If mobile computing device 100 determines that one or more of the resources to be included in the GUI view are not currently cached at mobile computing device 100, mobile computing device 100 may be configured to communicate with GUI view provider system 120 to request and receive the relevant resources included in the GUI view. Lower power processor 102B may be configured to write the received resources individually onto flash memory and to use direct memory access to draw the resources at display device 106, such as by performing direct memory access of a bitmap image in a data block (e.g., of lower power processor 102B's processor cache) directly into a screen buffer associated with the display device without having to load an intermediate copy of the bitmap image into general memory of mobile computing device 100. In this way, lower power processors with limited amount of memory may be able to use the user interface framework described herein to generate and output GUI views for display at a display device, such as display device 106.

In some examples, a GUI view may be interactive so that the GUI view may be able to perform one or more actions based on user input received by mobile computing device 100. As described above, GUI view data such as GUI view data 112 may define one or more actions associated with a GUI view that may be performed by mobile computing device 100 in response to user interactions with the GUI view, such as reloading the GUI view, launching a platform specific application on the mobile device, such as via accessing deep links to such applications, accessing a remote resource via the network (e.g., network 110), and the like. Renderer 108B may therefore act as an action handler to monitor for user input that corresponds to a user interaction with the GUI view. Renderer 108B may, in response to detecting a user interaction with the GUI view outputted at display device 106, such as touch input that corresponds to selecting an element of the GUI view, perform an action associated with the user interaction as defined by GUI view data 112. For example, a GUI view that provides weather information may include a link to a more detailed weather forecast provided by a native weather application on mobile computing device 100. When renderer 108B detects a user interaction that selects an element in the GUI view that is a link to the detailed weather forecast, renderer 108B may perform an action associated with the selection of the link in the GUI view by causing the mobile computing device 110A to launch the native weather application to show the detailed weather forecast that is linked from the GUI view.

While aspects of the present disclosure are described with respect to mobile computing device 100 that includes both a higher power processor 102A and lower power processor 102B, the techniques of the present disclosure can also be performed on mobile computing devices with different processor architectures, such as a mobile computing device that only includes a higher power processor or a mobile computing device that only includes a lower power processor. For example, a higher power processor may equally perform all of the techniques described herein as being performed by lower power processor 102B to process GUI view data to generate platform-specific instructions that can be executed to output a GUI view for display at a display device.

FIG. 2 is a block diagram illustrating an example mobile computing device 200, in accordance with one or more aspects of the present disclosure. Mobile computing device 200 may comprise an example of mobile computing device 100 illustrated in FIG. 1, where similarly numbered components may provide similar functions to those described in reference to FIG. 1. FIG. 2 illustrates only one particular example of mobile computing device 200, and many other examples of mobile computing device 200 may be used in other instances and may include a subset of the components included in example mobile computing device 200 or may include additional components not shown in FIG. 2.

In the example of FIG. 2, mobile computing device 200 includes display device 202, one or more processors 220, one or more input components 222, one or more communication units 224, one or more output components 226, a power source 228, and one or more storage devices 250. Communication channels 227 may interconnect each of the components 220, 222, 202, 224, 228, 226, and/or 250 for inter-component communications (physically, communicatively, and/or operatively). In some examples, communication channels 227 may include a system bus, a network connection, an inter-process communication data structure, or any other method for communicating data between hardware and/or software.

One or more input components 222 of mobile computing device 200 may receive input, such as input from a user. Examples of input are touch/tactile, presence-sensitive, and audio input. Examples of input components 222 include a presence-sensitive screen, touch-sensitive screen, touchscreen, mouse, keyboard, trackpad, voice responsive system, video camera, microphone or any other type of device for detecting input from a human or machine.

One or more output components 226 of mobile computing device 200 may generate output. Examples of output are haptic, audio, and visual output. Examples of output components 226 include a presence-sensitive screen, a touch-sensitive screen, a touchscreen, a sound card, a video graphics adapter card, a speaker, a liquid crystal display (LCD), an organic light-emitting diode (OLED) display, a micro light-emitting diode (microLED) display, an active matrix organic light-emitting diode (AMOLED) display, a haptic device, or any other type of device for generating output to a human or machine.

One or more communication units 224 of mobile computing device 200 may communicate with external devices via one or more networks by transmitting and/or receiving network signals on the one or more networks (e.g., one or more wired and/or wireless networks). For example, mobile computing device 200 may use communication units 224 to transmit and/or receive radio signals on a radio network such as a cellular radio network. Likewise, communication units 224 may transmit and/or receive satellite signals on a satellite network such as a global positioning system (GPS) network. Examples of communication units 224 include a network interface card (e.g. such as an Ethernet card), an optical transceiver, a radio frequency transceiver, a GPS receiver, or any other type of device that can send and/or receive information. Other examples of communication units 224 may include short wave radios, cellular data radios, wireless Ethernet network radios, as well as universal serial bus (USB) controllers.

Display device 202 of mobile computing device 200 includes display component 223 and presence-sensitive input component 225. In some examples, display device 202 may provide output to a user using haptic, audio, or visual stimuli as described above with reference to output components 226. For example, display component 223 may provide display or video output as described with reference to output components 226. Display device 202 may also provide input capabilities such as that described above with reference to input components 222. For example, presence-sensitive input component 225 may provide input capabilities as described with reference to input components 222.

Display component 223 may be a screen at which information is displayed by display device 202, and presence-sensitive input component 225 may detect an object at and/or near display component 223. As one example range, presence-sensitive input component 225 may detect an object, such as a finger or stylus that is within two inches or less of display component 223. Presence-sensitive input component 225 may determine a location (e.g., an (x,y) coordinate) of display component 223 at which the object was detected. In another example range, presence-sensitive input component 225 may detect an object six inches or less from display component 223 and other ranges are also possible. Presence-sensitive input component 225 may determine the location of display component 223 selected by a user's finger using capacitive, inductive, radar-based, and/or optical recognition techniques. In some examples, presence-sensitive input component 225 also provides output to a user using touch, presence-sensitive, audio, or video stimuli as described with respect to display component 223. Display component 223 may be any type of output device that provides visual output, such as described with respect to output components 226.

While illustrated as an internal component of mobile computing device 200, display device 202 may also represent an external component that shares a data path with mobile computing device 200 for transmitting and/or receiving input and output. For instance, in one example, display device 202 represents a built-in component of mobile computing device 200 located within and physically connected to the external packaging of mobile computing device 200 (e.g., a screen on a mobile phone). In another example, display device 202 represents an external component of mobile computing device 200 located outside and physically separated from the packaging of mobile computing device 200 (e.g., a monitor and/or a projector that shares a wired and/or wireless data path with a tablet computer).

Display device 202 of mobile computing device 200 may detect two-dimensional and/or three-dimensional gestures as input from a user of mobile computing device 200. For instance, a sensor of display device 202 (e.g., sensor of presence-sensitive input component 225) may detect a user's movement (e.g., moving a hand, an arm, a pen, a stylus) within a threshold distance of the sensor of display device 202. Display device 202 may determine a two- or three-dimensional vector representation of the movement and correlate the vector representation to a gesture input (e.g., a hand-wave, a pinch, a clap, a pen stroke) that has multiple dimensions. In other words, display device 202 can detect a multi-dimensional gesture without requiring the user to gesture at or near a screen or surface (e.g., display component 223) at which display device 202 outputs information for display. Instead, display device 202 can detect a multidimensional gesture performed at or near a sensor which may or may not be located near the screen or surface at which display device 202 outputs information for display.

One or more storage devices 250 within mobile computing device 200 may store information for processing during operation of mobile computing device 200 (e.g., during execution of one or more of UI module 230, applications 232, operating system 242, UI module 230, renderer 234, GUI view provider 238, or action handler 240). In some examples, storage devices 250 include temporary memory, meaning that a primary purpose of storage devices 250 is not long-term storage. Storage devices 250 on mobile computing device 200 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 250, in some examples, include one or more computer-readable storage media. Storage devices 250 may be configured to store larger amounts of information than volatile memory. Storage devices 250 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. In the example of FIG. 2, storage devices 250 may store program instructions and/or data associated with one or more applications 232, UI module 230, operating system 242, UI module 230, renderer 234, GUI view provider 238, and action handler 240.

In certain examples, storage devices 250, or one or more of components included in storage devices 250, may be stored on one or more remote computing devices that are external to mobile computing device 200 (e.g., on one or more external servers). In some examples, one or more remote computing devices may store and/or execute UI module 230, applications 232, operating system 242, UI module 230, renderer 234, GUI view provider 238, and/or action handler 240. In these examples, the one or more remote computing devices may perform functionality similar to that described herein in reference to processors 220.

As shown in FIG. 2, mobile computing device 200 may include a power source 228. In some examples, power source 228 may be a battery. Power source 228 may provide power to one or more components of computing device 200. Non-limiting examples of power source 228 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 228 may have a limited capacity (e.g., 1000-3000 mAh).

One or more processors 220 may implement functionality and/or execute instructions within mobile computing device 200. Similar to mobile computing device 100 of FIG. 1, mobile computing device 200 may include lower power processor 210 and higher power processor 208. A combination of higher power processor 208 and lower power processor 210 on mobile computing device 200 may receive and execute instructions stored by storage devices 250 that execute the functionality of applications 232, operating system 242, UI module 230, renderer 234, GUI view provider 238, and action handler 240. These instructions executed by processors 220 may cause mobile computing device 200 to store information within storage devices 250 during program execution. Processors 220 may execute instructions of operating system 231, applications 232, renderer 234, GUI view provider 238, and action handler 240 to perform one or more operations. That is, operating system 231, applications 232, renderer 234, GUI view provider 238, and action handler 240 may be operable by processors 220 to perform various functions described herein.

In some alternate examples, mobile computing device 200 may only comprise or otherwise include processors 220. In these examples, input components 222, display device 202, communication units 224, output components 226, power source 228, and storage devices 250 may be external to, yet communicatively coupled with (e.g., via communication channels 227), mobile computing device 200.

In general, UI module 230 may manage the interactions with, and control the display of, user interfaces (e.g., GUI views) being presented at display device 202. For example, UI module 230 may receive information and/or instructions from various sources, such as renderer 234, for generating GUI views and in response, output instructions and information to display device 202 to cause display device 202 to display GUI views. In addition, UI module 230 may receive information from display device 202 in response to inputs detected by display device 202 at locations at which GUI views are displayed; and disseminate information about the inputs to various destinations (e.g., one or more system platforms, operating systems, applications, modules, and/or services executing at or in communication with computing device 200, such as action handler 240) for interpreting the input and for causing computing device 200 to perform a function. In some examples, UI module 230 may receive explicit instructions from a source for generating a user interface that is displayed by display device 202. However, in other cases, UI module 230 may receive other information (e.g., notification data) and automatically generate a user interface that is displayed by display device 202 based on the other information.

Applications 232 may include one or more different various applications. An e-mail application, a camera application, a map or navigation application, a calendar application, a messaging application, a social media application, a travel application, a game application, a stock application, and a weather application are all examples of applications 232.

As shown in FIG. 2, lower power processor 210 may execute renderer 234 to generate one or more GUI views. In some examples, mobile computing device 200 may communicate with a GUI view provider system over a network (e.g., the Internet) via one or more communication units 224 to request and receive GUI view data that renderer 234 may process to generate one or more GUI views. In other examples, higher power processor 208 may execute GUI view provider 238 to generate GUI view data. For example, lower power processor 210 may communicate with higher power processor 208 to send a request for GUI view data to higher power processor 208. Higher power processor may execute GUI view provider 238 to generate GUI view data based on the request and may send the generated GUI view data to lower power processor 210. Lower power processor 210 may, in response to receiving GUI view data from a GUI provider system or from higher power processor 208, cache the GUI view data in one or more storage devices 250.

In some examples, the GUI view data may specify for each of a set of GUI views, a UI layout, one or more actions, and one or more resources. Lower power processor 210 may execute renderer 234 to receive the GUI view data and to generate platform-specific instructions (e.g., instructions that are native to lower power processor 210) for generating the GUI views specified by the GUI view data based on the layout, the one or more actions, and the one or more resources for each of the GUI views specified by the GUI view data. Lower power processor 210 may therefore cache the generated platform-specific instructions for generating the GUI views in one or more storage devices 250.

Lower power processor 210 may execute the platform-specific instructions for generating a GUI view to generate the GUI view and to output the GUI view for display at display component 223 of display device 202. When the GUI view data specifies, for the GUI view, one or more resources associated with the GUI view, such as images, videos, audio, and the like, generating the GUI view and outputting the GUI view for display at display component 223 may include generating the GUI view that includes one or more resources and outputting the GUI view that includes the one or more resources for display at display component 223.

In some examples, the GUI view data may bundle or otherwise include the one or more resources associated with the GUI view in the GUI view data. If lower power processor 210 determines that the one or more resources are included in the GUI view data, lower power processor 210 may be able to retrieve the one or more resources associated with the GUI view from one or more storage devices 250.

In some examples, if the GUI view does not include the one or more resources associated with the GUI view in the GUI view data, lower power processor 210 may determine whether the one or more resources are cached in one or more storage devices 250. For example, mobile computing device 200 may have previously retrieved the one or more resources for rendering a previous GUI view and may have therefore cached the one or more resources in one or more storage devices 250. If lower power processor 210 determines that the one or more resources are cached in one or more storage devices 250, lower power processor 210 may be able to retrieve the one or more resources associated with the GUI view from one or more storage devices 250.

In some examples, if the GUI view does not include the one or more resources associated with the GUI view in the GUI view data, and if the one or more resources are cached in one or more storage devices 250, lower power processor 210 may send one or more requests for the one or more resources via one or more communication units 224 to a resource provider. Lower power processor 210 may, in response, receive the one or more resources associated with the GUI view from the resource provider via one or more communication units 224.

In some examples, if two or more resources are associated with a GUI view to be outputted for display at display component 223, lower power processor 210 may separately retrieve each of the two or more resources and may, upon retrieving a resource, output the resource for display at display component 223 as part of the GUI view prior to retrieving another resource of the two or more resources. For example, renderer 234 may make separate API calls to retrieve each of the two or more resources.

For example, if three resources are associated with a GUI view, where the first resource is cached in one or more storage devices 250 and the second and third resources are not cached in one or more storage devices 250, lower power processor 210 may retrieve the first resource and may output the first resource for display at display component 223 as part of the GUI view. After retrieving the first resource, lower power processor 210 may send a request to a resource provider for the second resource and may, in response to receiving the second resource, output the second resource for display at display component 223 as part of the GUI view. After retrieving the second resource, lower power processor 210 may send a request to the resource provider for the third resource and may, in response to receiving the third resource, output the third resource for display at display component 223 as part of the GUI view.

In this way, lower power processor 210 may retrieve and output individual resources associated with a GUI view, which may enable computing devices with a relatively limited amount of memory that may not be able to store multiple resources in memory at the same time. In some examples, to further conserve the amount of available memory in mobile computing device 200, when a resource associated with a GUI view is a bitmap image, lower power processor 210 may, upon receiving or retrieving the bitmap image, perform a direct memory access to write the bitmap image to the processor cache of the lower power processor and to draw the bitmap image from the processor cache of lower power processor 210 directly into the screen buffer of display component 223 without having to load an intermediate copy of the bitmap image into one or more storage devices 250. Performing such direct memory access to write a bitmap image from a processor cache to the screen buffer may prevent an additional copy of the bitmap image from being written to one or more storage devices 250.

In some examples, lower power processor 210 may determine a GUI view out of the set of GUI views specified by GUI view data to output for display at display component 223 of display device 202 by selecting a GUI view out of the GUI views that is most relevant to the context of mobile computing device 200 and/or the surrounding environment of computing device 200. Lower power processor 210 may, in response to selecting a GUI view out of the GUI views that is most relevant to the context of mobile computing device 200 and/or the surrounding environment of computing device 200, execute the platform-specific instructions for generating the selected GUI view to generate the GUI view and to output the GUI view for display at display component 223 of display device 202.

In some examples, the GUI view data may specify a set of GUI views in the form of a timeline, where each GUI view in the set of GUI views specified by the GUI view data may be a timeline entry in the timeline. The timeline may specify, for each of the set of GUI views, one or more conditions associated with the GUI view, and lower power processor 210 may determine the GUI view that is most relevant to the context of mobile computing device 200 and/or the surrounding environment of computing device 200 based on the one or more conditions associated with each of the set of GUI views.

In some examples, the one or more conditions associated with a GUI view may be a period of time during which the associated GUI view is a relevant GUI view. For example, a first GUI view in the set of GUI views may be associated with a time period of between 8:00 AM and 9:00 AM, such as a GUI view that presents the details of a meeting from 8:00 AM to 9:00 AM and a second GUI view in the set of GUI views may be associated with a time period of between 9:30 AM and 10:30 AM, such as a GUI view that presents the details of a second meeting from 9:30 AM to 10:30 AM. Thus, when lower power processor 210 attempts to determine, at 8:15 AM, the most relevant GUI view out of the set of GUI views, lower power processor 210 may determine the first GUI view to be the most relevant GUI view, and may output the first GUI view for display at display component 223. As the first GUI view is displayed at display component 223, lower power processor 210 may determine, at 9:00 AM, that the first GUI view is no longer relevant and may cease display of the first GUI view at display component 223. At 9:30 AM, lower power processor 210 may determine that the second GUI view to now be the most relevant GUI view, and may output the second GUI view for display at display component 223 until 10:30 AM.

In some examples, the one or more conditions associated with a GUI view may be a time, such as a GUI view that presents a reminder for a meeting. For example, a GUI view may be associated with a time of 12:45 PM to remind the user of mobile computing device 200 of a scheduled meeting at 1:00 PM. When lower power processor 210 determines that the current time matches the time associated with a GUI view, lower power processor 210 may determine, that the GUI view associated with the current time to be the most relevant GUI view, and may output the GUI view for display at display component 223.

A first GUI view in the set of GUI views may be associated with a time period of between 8:00 AM and 9:00 AM and a second GUI view in the set of GUI views may be associated with a time period of between 9:00 AM and 10:00 AM. Thus, when lower power processor 210 attempts to determine, at 8:15 AM, the most relevant GUI view out of the set of GUI views, lower power processor 210 may determine the first GUI view to be the most relevant GUI view, and may output the first GUI view for display at display component 223. As the first GUI view is displayed at display component 223, lower power processor 210 may determine, at 9:00 AM, that the first GUI view is no longer relevant and may instead determine that the second GUI view to be the most relevant GUI view, and may output the second GUI view for display at display component 223 and to cease display of the first GUI view at display component 223.

In some examples, the one or more conditions associated with a GUI view may be an activity performed by the user of mobile computing device 200, such as a GUI view that presents a fitness tracker to track the user's workouts. When lower power processor 210 performs activity recognition to determine that the user of mobile computing device 200 is performing an activity associated with a GUI view, lower power processor 210 may determine, that the GUI view associated with the activity performed by the user to be the most relevant GUI view, and may output the GUI view for display at display component 223.

In some examples, the one or more conditions associated with a GUI view may be a location, such as a GUI view that presents a shopping list for the user when the user is at a grocery store. When lower power processor 210 determines that the location of mobile computing device 200 corresponds to the location associated with a GUI view, lower power processor 210 may determine, that the GUI view associated with the location of mobile computing device 200 to be the most relevant GUI view, and may output the GUI view for display at display component 223.

In some examples, action handler 240 may execute to monitor for user interactions with a GUI view outputted for display at display component 223, such as via user input received at presence-sensitive input component 225 or input components 222, and to perform one or more actions in response to detecting such user interactions. For example, action handler 240 may, in response to detecting a user interaction with the GUI view, determine an action that corresponds to the user interaction based at least in part on the one or more actions for the GUI view specified by the GUI view data. Such actions may include opening a deep link to a native application executing on lower power processor 210 or higher power processor 208, a deep link to a native application executing on a companion computing device (e.g., a smart phone) communicably coupled to mobile computing device 200, or may include opening a link to a remote network resource (e.g., a website) or a non-native application. Action handler 240 may, in response to determining that the detected user interaction with the GUI view corresponds to an action specified by the GUI view data, perform the corresponding action to, for example, open a deep link to a native application or to open a link to a remote network resource.

Figure 3:
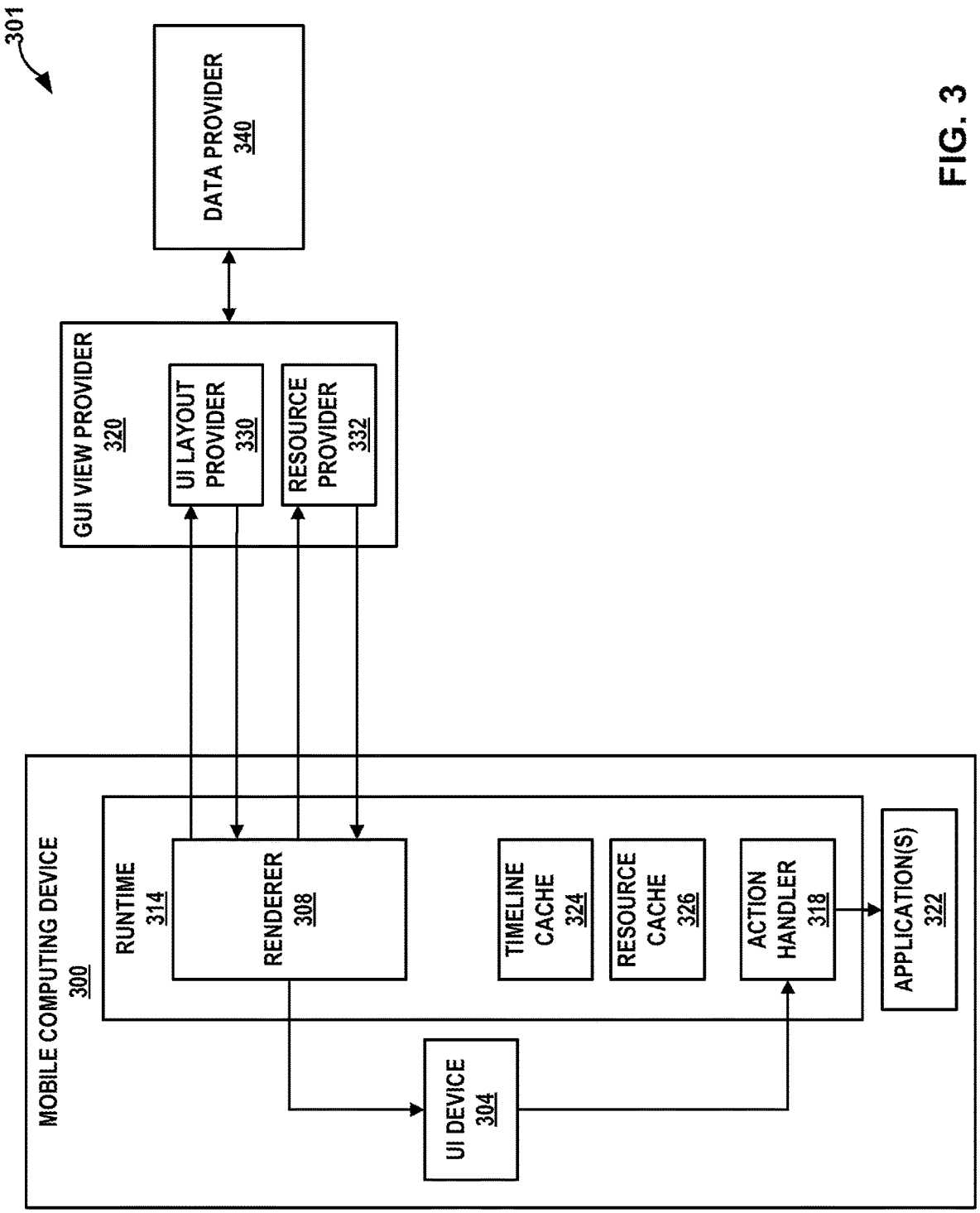
FIG. 3 is a conceptual diagram illustrating an example system for providing a platform independent lightweight user interface framework in further detail, in accordance with one or more aspects of the present disclosure.

FIG. 3 is a conceptual diagram illustrating an example system for providing a platform independent lightweight user interface framework in further detail, in accordance with one or more aspects of the present disclosure. As shown in FIG. 3, system 301 is an example of system 101 shown in FIG. 1 but shown in more detail. System 301 includes mobile computing device 300 that is an example of mobile computing device 100 shown in FIG. 1 and mobile computing device 200 shown in FIG. 2. Mobile computing device 300 may include renderer 308 that is an example of renderer 108A and/or render 108B shown in FIG. 1 and/or renderer 234 of FIG. 2.

Mobile computing device 300 may include a higher power processor, such as higher power processor 102A shown in FIG. 1 and higher power processor 208 shown in FIG. 2, a lower power processor, such as lower power processor 102B shown in FIG. 1 and lower power processor 210 shown in FIG. 2, or may include both a higher power processor and a lower power processor. Renderer 308 may execute on either a lower power processor, a higher power processor, or may execute on both a lower power processor and a higher power processor to generate and output GUI data for display at a display device, such as UI device 304.

System 301 includes GUI view provider 320 that is configured to generate GUI view data that is used by renderer 308. In some examples, GUI view provider 320 may be a cloud-based GUI view provider system, such as GUI view provider system 120 shown in FIG. 1 with which renderer 308 may communicate over a network. In other examples, GUI view provider 320 may be an application that is executed by mobile computing device 300, similar to GUI view provider 238 shown in FIG. 2. For example, GUI view provider 320 may execute on a higher power processor of mobile computing device 300 to generate GUI view data for use by renderer 308 that executes on a lower power processor of mobile computing device 300.

GUI view provider 320 may include UI layout provider 330 and resource provider 332. As described above with respect to FIGS. 1 and 2, a renderer such as renderer 308 may send a request to GUI view provider 320 for GUI view data separately from a request for resources associated with the GUI views specified by the GUI data. As such, UI layout provider 330 may be configured to handle requests for UI layout data of GUI views specified by GUI view data from the renderer 308 while resource provider 332 may be configured to handle requests for resources associated with the GUI views specified by the GUI data from renderer 308.

Renderer 308 may execute on one or more processors of mobile computing device 300 as part of runtime 314, which may implement an execution model for executing renderer 308 on the one or more processors of mobile computing device 300. For example, runtime 314 may implement an execution model that enables renderer 308 to execute on the lower power processor of mobile computing device 300. Renderer 308 may execute to request GUI view data from GUI view provider 320.

As described above, renderer 308 may request GUI view data from UI layout provider 330. GUI view data may specify a set of GUI views. GUI view data may specify, for each GUI view in the set of GUI views, GUI layout information for laying out content and resources in the GUI view, one or more actions associated with the GUI view, content included in the GUI view and one or more resources to be included with the GUI view. In some examples, GUI view data may specify the set of GUI views in the form of a timeline, where each GUI view is specified as a timeline entry in the timeline, and each of the GUI views may be associated with one or more conditions for activating the GUI view. GUI view data may not include (e.g., bundle in the GUI view data) the resources associated with the set of GUI views.

In some examples, a set of GUI views in a GUI view data may be related to each other. For example, a GUI view data associated with calendar events may include a set of GUI views of a user of mobile computing device 300's calendar events (e.g., scheduled meetings) for the day. In another examples, a GUI view data associated with fitness tracking may include a set of GUI views of different fitness tracking functionalities.

As part of generating the requested GUI view data, UI layout provider 330 may communicate with data provider 340 to receive data that may be included as content in one or more GUI views specified by the GUI view data. For example, to generate a GUI view data that provides weather information for a location, UI layout provider 330 may communicate with a weather data provider to receive weather information for the location, and UI layout provider 330 may include, in the GUI view data as content for a GUI view, the weather information for the location received from the weather data provider.

The GUI view data may be structured data that includes platform-neutral (e.g., cross-platform) layout descriptions for drawing the layout of each GUI view specified by the GUI view data. UI layout provider 330 may serialize the structured data of the GUI view data using any suitable data serializing protocol, such as protocol buffers to send the GUI view data to mobile computing device 300.

The GUI view data may, for each GUI view specified in the GUI view data, specify content of the GUI view, such as text and resources (e.g., images) included in the GUI view. The GUI view data may also, for each GUI view specified in the GUI view data, specify layout information for such text and resources, such as specifying rows of text or resources, columns of text or resources, spacers for controlling the spacing of text and/or resources in the GUI view, and the like. The GUI view data may also, for each GUI view specified in the GUI view data, specify one or more actions to be performed in response to user interaction with one or more elements of the GUI view.

An example of structured data that specifies the content, actions, and layout information of a GUI view is as follows:
```
message TileData
    string resources version=1;
    repeated TimelineEntry timeline entry=2;
}
message Text
    string value=1;
    TextStyle style=2;
}
message Image {
    string resource id=1;
    Dimensions dimensions=2;
}
message Spacer {
    Dimensions dimensions=1;
}
message Container {
    Composable content=1;
    ContainerStyle style=2;
}
message Column {
    repeated Composable content=1;
}
message Row {
    repeated Composable content=1;
}
message Composable {
    one of value {
        Column column=1;
        Row row=2;
        Container container=3;
        Spacer spacer=4;
        Text text=5;
        Image image=6;
        Actionable actionable=7;
    }
}
message Actionable {
    string id=1;
    Composable content=2;
    Action action=3;
}
```

For example, GUI view data may specify, for a GUI view, a layout containing three rows of text with the following example structured data:
```
Container(
    expanded=true,
    alignment=Alignment.Center
){
    Column
        Text("text 1")
        Text("text 2")
        Text("text 3")
    }
}
```

In another example, GUI view data may specify, for a GUI view, a layout containing three rows of text with the following example structured data:
```
container {
    style}
        expanded: . . .
        horizontal_alignment: HALIGN_CENTER
        vertical_alignment: VALIGN_CENTER
    }
content} column}
    content text value: "text 1"
    content text value: "text 2"
    content text value: "text 3"
    }
    }
}
```

Renderer 308 may receive the requested GUI view data from UI layout provider 330. As described above, UI layout provider 330 may generate and send GUI view data as structured data that includes platform-independent layout description for drawing a GUI view. For example, UI layout provider 330 may generate GUI view data in the form of protocol buffers, so that UI layout provider 330 may generate and serialize GUI view data as protocol buffers for sending to renderer 308.

Renderer 308 may receive the GUI view data, such as in the form of protocol buffers, and may process the platform-independent layout description specified by the GUI view data to generate platform-specific instructions for generating a GUI view. In some examples, the GUI view data received by renderer 308 may be in the form of timeline data, where each GUI view in the set of GUI views specified by the GUI view data is a timeline entry in the timeline data. The timeline data may specify, for each of the GUI views, one or more conditions under which the GUI view is a relevant view, as discussed in more detail below. An example of structured data that specifies a UI view as a timeline entry in the timeline data is as follows:

```
message TimelineEntry {
  string id=1;
  Composable content=2;
  TimeInterval validity=3;
}
message TileData {
  string resources version=1;
  repeated TimelineEntry timeline entry=2;
}
```

Renderer 308 may store such timeline data in timeline cache 324, which may be cache memory of the processor on which renderer 308 executes, such as the cache of a lower power processor of mobile computing device 300. Because timeline data may be a form of GUI view data, caching the timeline data may include caching the set of GUI views that are timeline entries in the timeline data, including, for each GUI view, caching the layout information of the GUI view, the content of the GUI view, the specification of one or more resources of the GUI view, the one or more actions of the GUI view, the one or more conditions under which the GUI view is a relevant GUI view, and the like.

Mobile computing device 300 may execute the platform-specific instructions generated by renderer 308 to output a GUI view for display at a display device, such as UI device 304. To output the GUI view, mobile computing device 300 may output the content and resources specified by the GUI data for the GUI view as UI elements of the GUI view according to the UI layout information specified by the GUI data for the GUI view. UI device 304 may also associate one or more action specified by the GUI data for the GUI view with one or more of the UI elements of the GUI view, so that mobile computing device 300 may, in response to receiving user input that selects a UI element associated with an action, perform the action associated with the UI element.

As part of executing the platform-specific instructions to output the GUI view, mobile computing device 300 may output one or more resources in the GUI view. In some examples, the GUI view data may bundle, in the GUI view data the resource of a GUI view. That is, when renderer 308 receives GUI view data from UI layout provider 330, the GUI view data may include one or more resources of one or more of the GUI views specified by the GUI view data. In some examples, the GUI view data may bundle a resource in the form of raw resource data, such as image data (e.g., a bitmap image), video data, audio data, and the like. As such, outputting a GUI view that includes a resource bundled in GUI view data for display at UI device 304 may include outputting the bundled resource as part of the GUI view data for display at UI device 304.

In some examples, the GUI view data may specify a resource of a GUI view as a reference (e.g., a path) to a native application resource on mobile computing device 300. Examples of references to native application resources on mobile computing device 300 may include references to resources that are native to the operating system of mobile computing device 300, such as images, videos, audio, and the like included in the operating system of mobile computing device 300. Examples of references to native application resources on mobile computing device 300 may include references to third-party resources, such as resources included in third-party applications on mobile computing device 300. Such references to native application resources and third-party resources may indicate paths to the locations of such references in mobile computing device 300. As such, outputting a GUI view that includes a resource that is a reference to a native application resource for display at UI device 304 may include retrieving the resource based on the reference to the resource and outputting the resource as part of the GUI view data for display at UI device 304.

In some examples, the GUI view data may not bundle the one or more resources of a GUI view in the GUI view data and may not specify references to native application resources on mobile computing device 300. Instead, mobile computing device 300 may retrieve and/or receive the one or more resources, such as from resource provider 332, and output the one or more resources for display at UI device 304 as part of outputting the GUI view for display at UI device 304.

In some examples, before sending a request to resource provider 332 to retrieve a resource of a GUI view as part of outputting a GUI view for display at UI device 304, mobile computing device 300 may determine whether a resource of GUI view is cached in resource cache 326. Resource cache 326 may be cache memory of the processor on which renderer 308 executes, such as the cache of a lower power processor of mobile computing device 300. A resource may be stored in resource cache 326 as a result of the resource being previously outputted when outputting a GUI view that includes the resource.

If mobile computing device 300 determines that the resource is stored in resource cache 326, then mobile computing device 300 may retrieve the resource from resource cache 326. In some examples, the GUI view data may, when specifying a resource included in a GUI view, specify a resource version associated with the resource. Computing device 300 may therefore determine, based on the resource version associated with a resource of a GUI view, whether a resource of the GUI view is stored in the resource cache 326 by determining whether a resource stored in resource cache 326 is associated with the same resource version as the resource in the GUI view. If mobile computing device 300 determines that a resource included in the GUI view is stored in resource cache 326, renderer 308 may execute to retrieve the resource from resource cache 326.

If mobile computing device 300 determines that a resource of a GUI view is not stored in resource cache 326, renderer 308 may execute to send a request to resource provider 332 of GUI view provider 320 for the resource. Mobile computing device 300 may receive the requested resource and may therefore output the GUI view that includes the resource for display at UI device 304. In some examples, mobile computing device 300 may also, in response to receiving a requested resource from resource provider 332, store the received resource in resource cache

326. Mobile computing device 300 may also store an indication of the resource version of the resource in memory, such as in resource cache 326 that can be used by renderer 308 to determine whether a resource associated with a specific resource version is stored in resource cache 326.

In some examples, if a GUI view includes two or more resources, mobile computing device 300 may send separate requests for each resource of the two or more resources to resource provider 332 to separately retrieve each of the two or more resources. By sending separate requests for each of the two or more resources, mobile computing device 300 may not have to wait to receive each of the two or more resources of the GUI view from resource provider 332 prior to outputting the two or more resources for display at UI device 304. Instead, mobile computing device 300 may separately request, receive, and output each of the two or more resources. For example, mobile computing device 300 may send a request for a resource of the two or more resources to resource provider 332, receive the resource from resource provider 332, and output the resource for display at UI device 304 prior to sending a request for another resource of the two or more resources.

In some examples, when mobile computing device 300 receives a resource, such as a bitmap image, from resource provider 332, mobile computing device 300 may use direct memory access to draw the resource at UI device 304, such as by performing direct memory access of the bitmap image in a data block of the processor cache of the processor directly into a screen buffer associated with UI device 304. Performing such a direct memory access of the bitmap image from the processor cache to the screen buffer may enable mobile computing device 300 to not have to store an intermediate copy of the bitmap images into general memory of mobile computing device 300 when outputting the bitmap image for display at UI device 304. Such a technique may be useful when mobile computing device 300 has a limited amount of general memory by saving space in the general memory when drawing a UI view that includes resources such as bitmap images.

Renderer 308 of mobile computing device 300 may determine a GUI view out of the set of GUI views specified by the GUI view data to output for display at UI device 304 based on one or more conditions associated with the GUI view. As described above, the GUI view data may specify a set of GUI views and may specify, for each GUI view in the set of GUI views, one or more conditions associated with the GUI view that, when met, make the associated GUI view the relevant GUI view out of the set of GUI views.

Mobile computing device 300 may monitor contextual information associated with mobile computing device 300 and/or the surrounding environment of mobile computing device 300 to determine whether the contextual information meets the one or more conditions associated with a GUI view. When mobile computing device 300 determines that the contextual information meets the one or more conditions associated with a GUI view out of a set of GUI views specified by the GUI data, renderer 308 may determine that the GUI view is a relevant view out of the set of GUI views, and may output the GUI view for display at UI device 304.

In some examples, the one or more condition associated with a GUI view may be a time period (e.g., between 9:00 AM and 10:00 AM) when the GUI view is relevant. For example, if the GUI view data includes a set of GUI views that are associated with the scheduled meetings of the user of computing device 300 for a particular day, the GUI view data may include a set of views that are each associated with a particular period.

For example, the GUI view data may specify a first GUI view associated with the time period from 9:00 AM to 10:00 AM and a second GUI view associated with the time period from 10:30 AM to 10:45 AM. At 9:00 AM, renderer 308 may determine that the first GUI view associated with the time period from 9:00 AM to 10:00 AM has become a relevant GUI view, and may output the first GUI view for display at UI device 304. At 10:00 AM, renderer 308 may determine that the first GUI view associated with the time period of between 9:00 AM and 10:00 AM is no longer a relevant GUI view, and may cease outputting the first GUI view for display at UI device 304. At 10:30 AM, renderer 308 may determine that the second GUI view associated with the time period from 10:30 AM to 10:45 AM has become a relevant GUI view, and may output the second GUI view for display at UI device 304. At 10:45 AM, renderer 308 may determine that the second GUI view associated with the time period of between 10:30 AM and 10:45 AM is no longer a relevant GUI view, and may cease outputting the second GUI view for display at UI device 304.

In some examples, the one or more condition associated with a view may be a location. For example, a GUI view data may specify a first GUI view associated with the location of a first supermarket, where the first GUI view provides a shopping list for the first supermarket, and a second GUI view associated with a second supermarket, where the second GUI view provides a shopping list for the second supermarket. When renderer 308 determines that mobile computing device 300 is at the first supermarket, renderer 308 may determine that the first GUI view associated with the first supermarket has become a relevant GUI view, and may output the first GUI view for display at UI device 304 to display the shopping list for the first supermarket. When renderer 308 determines that mobile computing device 300 is no longer at the first supermarket, renderer 308 may determine that the first GUI view is no longer a relevant view and may cease outputting the first GUI view for display at UI device 304.

When renderer 308 determines that mobile computing device 300 is at the second supermarket, renderer 308 may determine that the second GUI view associated with the second supermarket has become a relevant GUI view, and may output the second GUI view for display at UI device 304 to display the shopping list for the second supermarket. When renderer 308 determines that mobile computing device 300 is no longer at the second supermarket, renderer 308 may determine that the second GUI view is no longer a relevant view and may cease outputting the second GUI view for display at UI device 304.

In some examples, the one or more condition associated with a view may be the activity being performed by the user of mobile computing device 300. For example, a GUI view data may specify a set of views associated with different physical activities being performed by the user. For example, the GUI view data may specify a first GUI view associated with the activity of walking, where the first GUI view provides a fitness tracker UI that tracks activity information associated with walking (e.g., step count, calorie count, time, distance walked, etc.), and a second GUI view associated with the activity of cycling, where the second GUI view provides a fitness tracker UI that tracks activity information associated with cycling (e.g., distance cycled, calorie count, time, etc.).

Mobile computing device 300 may perform activity recognition, such as via use of one or more sensors at mobile computing device 300, to determine the activity being performed by the user of mobile computing device 300.

When renderer 308 determines that the user is walking, renderer 308 may determine that the first GUI view associated with the activity of walking has become a relevant GUI view, and may output the first GUI view for display at UI device 304 to provide a fitness tracker UI to track the user's walking. When renderer 308 determines that is no longer walking, renderer 308 may determine that the first GUI view is no longer a relevant view and may cease outputting the first GUI view for display at UI device 304.

When renderer 308 determines that the user is cycling, renderer 308 may determine that the second GUI view associated with the activity of cycling has become a relevant GUI view, and may output the second GUI view for display at UI device 304 to provide a fitness tracker UI to track the user's cycling. When renderer 308 determines that mobile computing device 300 is no longer cycling, renderer 308 may determine that the second GUI view is no longer a relevant view and may cease outputting the second GUI view for display at UI device 304.

In this way, renderer 308 may execute to determine, based on contextual information such as the time of the day, the location of mobile computing device 300, the activity being performed by the user of mobile computing device, and the like, whether one or more conditions associated with a GUI view has been met. If renderer 308 determines that one or more conditions associated with a GUI view has been met, renderer 308 may execute to output the GUI view for display at UI device 304.

As describe above, mobile computing device 300 may cache GUI view data received from UI layout provider 330 in timeline cache 324. As such, the one or more conditions associated with each GUI view in the set of GUI views specified by the GUI view data may be cached in timeline cache 324 along with the UI layout information, the content, the one or more actions, and the like for each GUI view in the set of views specified by GUI view data. Thus, when renderer 308 determines that a GUI view in the set of GUI views has become relevant, the renderer 308 may use the UI layout information, the content, and the one or more actions of the GUI view cached in timeline cache 324 to render the GUI view and output the GUI view for display at UI device 304. Being able to use such information cached in timeline cache 324 to render a GUI view may minimize the amount of requests sent from mobile computing device 300 to GUI view provider 320 when renderer 308 switches from outputting a GUI view specified by GUI view data to outputting another GUI view specified by GUI view data.

As mobile computing device 300 outputs a GUI view for display at UI device 304, action handler 318 may be able to handle user interactions with the GUI view as received at UI device 304. The GUI view data received by renderer 308 may specify one or more actions that is to be performed by mobile computing device 300 in response to user interactions with the GUI view, and action handler 318 may in response to detecting an user interaction with the GUI view, determine, based on the one or more actions specified by the GUI view data, an appropriate action to perform by mobile computing device 300.

The GUI view data that specifies one or more actions to be performed in response to user interactions with the GUI view may specify one or more elements in the GUI view with which the user of mobile computing device 300 may interact to perform one or more actions. For example, an element in the GUI view can be assigned to an action by wrapping the element in the GUI view data with an indication that the element is an interactive element, such as in the example structured data below:

```
container {
    style {
        expanded: . . .
        horizontal_alignment: HALIGN_CENTER
        vertical_alignment: VALIGN_CENTER
    }
    content {actionable {
        content {text {value: "tappable!"}}
        action { . . . }
        }
    }
}
```

As can be seen in the above example, the text "tappable!" can be wrapped in an actionable element to indicate that the text "tappable!" is an interactive element.

In some examples, action handler 318 may, in response to detecting a user interaction with the GUI view, perform an action to access a deep link to a native application running on mobile computing device 300, such as one of the one or more applications 322. In other examples, action handler 318 may, in response to detecting a user interaction with the GUI view, perform an action to access a remote network resource, such as a website or other suitable network resources.

In some examples, GUI view data may specify a plurality of corresponding actions for different platforms. Because GUI view data includes platform-agnostic layout information for laying out a GUI view, if the GUI view specifies an action that that is specific to a platform (e.g., specific to an operating system), such as a deep link to a native application running on a particular platform, a different platform may not be able to perform the specified action. As such, in some examples, if the GUI view data supports actions being performed by two different platforms, the GUI view data may specify an action that is specific to a first platform, such as a deep link to a native application running on the first platform, and may also specify a corresponding action that is specific to a second platform, such as a deep link to a native application running on the second platform, where the first and second platforms may be two different operating systems. For example, the GUI view data may specify an action of launching a native application associated with a music streaming service on different operating systems by specifying, for each of the operating systems supported by the GUI view data, an action of launching a native application associated with the music streaming service.

Figure 4:
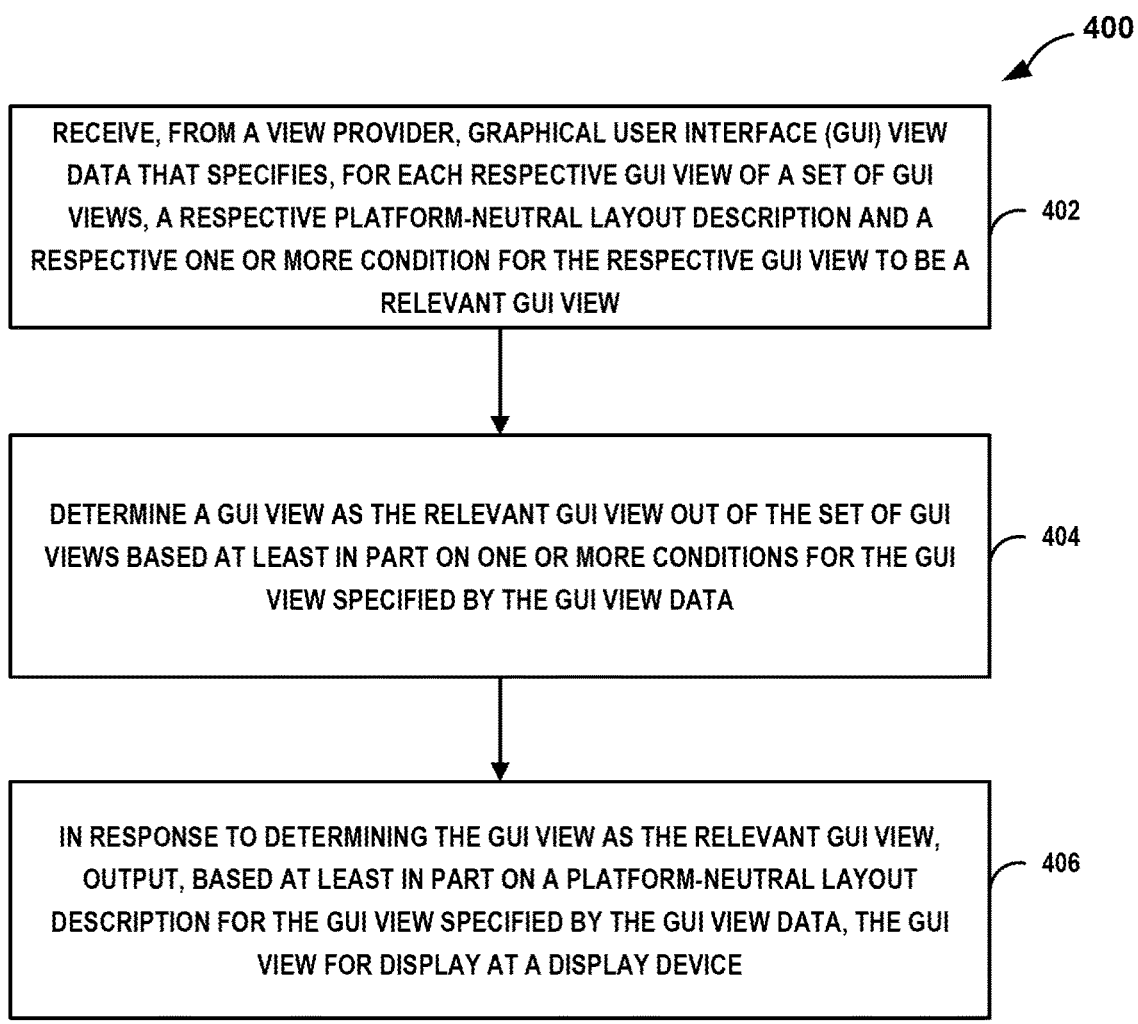
FIG. 4 is a flow diagram illustrating example operations of a mobile computing device, in accordance with one or more aspects of the present disclosure.

FIG. 4 is a flow diagram illustrating example operations of a process 400 that is performed by a mobile computing device, such as mobile computing device 100 (FIG. 1), mobile computing device 200 (FIG. 2), and/or mobile computing device 300 (FIG. 3), in accordance with one or more aspects of the present disclosure. For purposes of illustration only, the operations of FIG. 4 are described with reference to mobile computing device 200 shown in FIG. 2.

As shown in FIG. 4, process 400 includes receiving, by one or more processors 220 of a mobile computing device 200 from a view provider, graphical user interface (GUI) view data that specifies, for each respective GUI view of a set of GUI views, a respective platform-neutral layout description and a respective one or more condition for the respective GUI view to be a relevant GUI view (402). Process 400 further includes determining, by the one or more processors 220, a GUI view as the relevant GUI view out of the set of GUI views based at least in part on one or more conditions for the GUI view specified by the GUI view data (402). Process 400 further includes in response to determining the GUI view as the relevant GUI view, outputting, by the one or more processors 220 and based at least in part on a platform-neutral layout description for the GUI view specified by the GUI view data, the GUI view for display at a display device 202 (404).

The techniques of this disclosure includes the following examples.

Example 1: A method includes receiving, by one or more processors of a mobile computing device from a view provider, graphical user interface (GUI) view data that specifies, for each respective GUI view of a set of GUI views, a respective platform-neutral layout description and a respective one or more condition for the respective GUI view to be a relevant GUI view; determining, by the one or more processors, a GUI view as the relevant GUI view out of the set of GUI views based at least in part on one or more conditions for the GUI view specified by the GUI view data; and in response to determining the GUI view as the relevant GUI view, outputting, by the one or more processors and based at least in part on a platform-neutral layout description for the GUI view specified by the GUI view data, the GUI view for display at a display device.

Example 2: The method of example 1, further includes in response to receiving the GUI view data, caching, by the one or more processors, the GUI view data in memory; determining, by the one or more processors, a second GUI view as the relevant GUI view out of the set of GUI views based at least in part on one or more conditions for the second GUI view specified by the GUI view data cached in the memory; and in response to determining the second GUI view as the relevant GUI view, outputting, by the one or more processors and based at least in part on a platform-neutral layout description for the second GUI view specified by the GUI view data cached in the memory, the second GUI view for display at the display device.

Example 3: The method of any of examples 1 and 2, further includes determining, by the one or more processors, that the GUI view is no longer the relevant GUI view out of the set of GUI views based at least in part on the one or more conditions for the GUI view specified by the GUI view data; and in response to determining that the GUI view is no longer the relevant GUI view, ceasing, by the one or more processors, to output the GUI view for display at the display device.

Example 4: The method of any of examples 2 and 3, wherein: the one or more conditions for the second GUI view and the one or more conditions for the second GUI view is each associated with one or more of: a time period, a location, or an activity; and determining the second GUI view as the relevant GUI view out of the set of GUI views based at least in part on the one or more conditions for the second GUI view further comprises determining, by the one or more processors, that contextual information associated with the mobile computing device matches the one or more conditions associated with the second GUI view.

Example 5: The method of any of examples 2-4, wherein the GUI view data specifies one or more resources associated with one or more user interface (UI) elements of the second GUI view, further includes in response to receiving user input that corresponds to user interaction with an UI element of the second GUI view, performing, by the one or more processors, an action associated with the UI element as specified by the GUI view data.

Example 6: The method of example 5, wherein the action is accessing a deep link to a native application that executes at the mobile computing device.

Example 7: The method of any of examples 2-6, wherein the GUI view data specifies one or more resources associated with the second GUI view, wherein the one or more resources are not bundled in the GUI view data, and wherein outputting the second GUI view for display at the display device further comprises: retrieving, by the one or more processors, the one or more resources; and outputting, by the one or more processors, the one or more resources associated with the second GUI view for display at the display device.

Example 8: The method of example 7, wherein: retrieving the one or more resources further comprises in response to determining that the GUI view data specifies the one or more resources associated with the second GUI view, determining, based at least in part on one or more resource versions associated with the one or more resources, that the one or more resources are cached in a resource cache of the mobile computing device; and outputting the one or more resources associated with the second GUI view further comprises outputting, by the one or more processors, the one or more resources cached in the resource cache for display at the display device.

Example 9: The method of example 7, wherein: the one or more resources comprise a plurality of resources associated with the second GUI view; retrieving the one or more resources further comprises in response to determining that the GUI view data specifies the plurality of resources associated with the second GUI view, sending, by the one or more processors to a resource provider, a respective request for each respective resource of the plurality of resources; and wherein outputting the GUI view including the one or more resources for display at the display device further includes in response to receiving a resource of the plurality of resources from the resource provider, outputting, by the one or more processors, the resource for display at the display device.

Example 10: The method of example 9, wherein the resource is a bitmap image, and wherein outputting the resource for display at the display device further comprises: performing, by the one or more processors, a direct memory access of the resource from a processor cache of the one or more processors, into a screen buffer of the display device to output the resource for display at the display device.

Example 11: The method of any of examples 1-10, wherein: the mobile computing device includes both a higher power processor and a lower power processor, wherein the lower power processor is configured to consume less power than the higher power processor; and outputting, based at least in part on the platform-neutral layout description for the GUI view specified by the GUI view data, the GUI view for display at the display device further comprises: generating, by a renderer executing on the lower power processor of the mobile computing device and based on the platform-neutral layout description for the GUI view specified by the GUI view data, native instructions for the lower power processor to generate the GUI view; and executing, by the lower power processor, the native instructions to output the GUI view for display at the display device.

Example 12: A mobile computing device includes at least one processor; and a computer-readable storage device configured to store instructions that are executable by the at least one processor to: receive, from a view provider, graphical user interface (GUI) view data that specifies, for each respective GUI view of a set of GUI views, a respective platform-neutral layout description and a respective one or more condition for the respective GUI view to be a relevant GUI view; determine a GUI view as the relevant GUI view out of the set of GUI views based at least in part on one or more conditions for the GUI view specified by the GUI view data; and in response to determining the GUI view as the relevant GUI view, output, based at least in part on a platform-neutral layout description for the GUI view specified by the GUI view data, the GUI view for display at a display device.

Example 13: The mobile computing device of example 12, wherein the instructions are further executable by the at least one processor to: in response to receiving the GUI view data, cache the GUI view data in memory; determine a second GUI view as the relevant GUI view out of the set of GUI views based at least in part on one or more conditions for the second GUI view specified by the GUI view data cached in the memory; and in response to determining the second GUI view as the relevant GUI view, output, based at least in part on a platform-neutral layout description for the second GUI view specified by the GUI view data cached in the memory, the second GUI view for display at the display device.

Example 14: The mobile computing device of example 13, wherein: the one or more conditions for the second GUI view and the one or more conditions for the second GUI view is each associated with one or more of: a time period, a location, or an activity; and the instructions that are executable by the at least one processor to determine the second GUI view as the relevant GUI view out of the set of GUI views based at least in part on the one or more conditions for the second GUI view are further executable by the at least one processor to determine that contextual information associated with the mobile computing device matches the one or more conditions associated with the second GUI view.

Example 15: The mobile computing device of any of examples 13 and 14, wherein: the GUI view data specifies one or more resources associated with one or more user interface (UI) elements of the second GUI view; and the instructions are further executable by the at least one processor to, in response to receiving user input that corresponds to user interaction with an UI element of the second GUI view, perform an action associated with the UI element as specified by the GUI view data.

Example 16: The mobile computing device of any of examples 13-15, wherein: the GUI view data specifies one or more resources associated with the second GUI view; the one or more resources are not bundled in the GUI view data; and the instructions that are executable by the at least one processor to output the second GUI view for display at the display device are further executable by the at least one processor to: retrieve the one or more resources; and output the one or more resources associated with the second GUI view for display at the display device.

Example 17: The mobile computing device of example 16, wherein: the instructions that are executable by the at least one processor to retrieve the one or more resources are further executable by the at least one processor to, in response to determining that the GUI view data specifies the one or more resources associated with the second GUI view, determine, based at least in part on one or more resource versions associated with the one or more resources, that the one or more resources are cached in a resource cache of the mobile computing device; and the instructions that are executable by the at least one processor to output the one or more resources associated with the second GUI view are further executable by the at least one processor to output the one or more resources cached in the resource cache for display at the display device.

Example 18: The mobile computing device of example 16, wherein: the one or more resources comprise a plurality of resources associated with the second GUI view; the instructions that are executable by the at least one processor to retrieve the one or more resources are further executable by the at least one processor to, in response to determining that the GUI view data specifies the plurality of resources associated with the second GUI view, send, to a resource provider, a respective request for each respective resource of the plurality of resources; and the instructions that are executable by the at least one processor to output the GUI view including the one or more resources for display at the display device are further executable by the at least one processor to, in response to receiving a resource of the plurality of resources from the resource provider, output the resource for display at the display device.

Example 19: The mobile computing device of example 18, wherein: the resource is a bitmap image; and the instructions that are executable by the at least one processor to output the resource for display at the display device are further executable by the at least one processor to perform a direct memory access of the resource from a processor cache of the at least one processor into a screen buffer of the display device to output the resource for display at the display device.

Example 20: A computer-readable storage medium having stored thereon instructions that, when executed, cause one or more processors to: receive, from a view provider, graphical user interface (GUI) view data that specifies, for each respective GUI view of a set of GUI views, a respective platform-neutral layout description and a respective one or more condition for the respective GUI view to be a relevant GUI view; determine a GUI view as the relevant GUI view out of the set of GUI views based at least in part on one or more conditions for the GUI view specified by the GUI view data; and in response to determining the GUI view as the relevant GUI view, output, based at least in part on a platform-neutral layout description for the GUI view specified by the GUI view data, the GUI view for display at a display device.

Example 21: A method includes receiving, by a mobile computing device, graphical user interface (GUI) view data associated with a GUI view; generating, by the mobile computing device, platform-specific instructions for generating the GUI view based at least in part on the GUI view data; and executing, by the mobile computing device, the platform-specific instructions to output, for display, the GUI view.

Example 22: The method of example 21, wherein the GUI view data comprises serialized structured data.

Example 23: The method of any of examples 21 and 22, wherein the GUI view data is generated as protocol buffers.

Example 24: The method of any of examples 21-23, wherein the GUI view data comprises a platform-neutral layout description for drawing a layout of the GUI view.

Example 25: The method of any of examples 21-24, wherein the GUI view data comprises timeline data that specifies a set of views and one or more conditions for updating the GUI view to include a view from the set of views.

Example 26: The method of example 25, further includes caching, by the mobile computing device, the timeline data in a timeline cache.

Example 27: The method of example 26, further includes determining, by the mobile computing device and based at least in part on the timeline data, whether to update the GUI view to include a relevant view from the set of views cached in the timeline cache; and in response to determining to update the GUI view, updating, by the mobile computing device, the GUI view to include the relevant view cached in the timeline cache.

Example 28: The method of any of examples 21-27, wherein the GUI view data specifies one or more actions to be performed in response to one or more user interactions with the GUI view.

Example 29: The method of example 28, further includes detecting, by the mobile computing device, a user interaction with the GUI view; in response to detecting the user interaction with the GUI view, determining, based on the one or more actions specified by the GUI view data, an action that corresponds to the user interaction with the GUI view; and performing, by the mobile computing device, the action that corresponds to the user interaction with the GUI view.

Example 30: The method of example 29, wherein the action that corresponds to the user interaction with the GUI view comprises accessing a deep link to a native application running on the mobile computing device.

Example 31: The method of any of examples 29 and 30, wherein the action that corresponds to the user interaction with the GUI view comprises accessing a link to a remote network resource.

Example 32: The method of any of examples 21-31, wherein the GUI view data includes one or more resources that are bundled in the GUI view data.

Example 33: The method of any of examples 21-31, wherein the GUI view data does not include one or more resources that are included in the GUI view.

Example 34: The method of example 33, further includes sending, by the mobile computing device, a request for one or more resources that are included in the GUI view; and receiving, by the mobile computing device, the one or more resources that are included in the GUI view; wherein executing, by the mobile computing device, the platform-specific instructions to output, for display, the GUI view comprises outputting, for display, the GUI view that includes the one or more resources.

Example 35: The method of any of example 34, further includes storing, by the mobile computing device, the one or more resources in a resource cache.

Example 36: The method of any of examples 21-35, wherein receiving the GUI view data comprises: receiving, by the mobile computing device via a network from a GUI view data provider, the GUI view data.

Example 37: The method of any of examples 21-36, wherein the mobile computing device includes a lower power processor.

Example 38: The method of any of examples 21-37, wherein the mobile computing device includes both a higher power processor and a lower power processor, wherein the lower power processor is configured to consume less power than the higher power processor.

Example 39: The method of any of examples 21-36, wherein the mobile computing device includes a higher power processor and does not include a lower power processor.

Example 40: The method of any of examples 21-38, wherein: generating the platform-specific instructions for generating the GUI view based at least in part on the GUI view data comprises generating, by a renderer executing on a lower power processor of the mobile computing device, instructions for generating the GUI view that are specific to the lower power processor; executing, by the mobile computing device, the platform-specific instructions to output, for display, the GUI view comprises executing, by the lower power processor, the instructions for generating the GUI view that are specific to the lower power processor to output, for display, the GUI view.

Example 41: The method of example 40, wherein the instructions for generating the GUI view that are specific to the lower power processor comprise instructions for drawing the GUI view to a display device.

Example 42: The method of any of examples 21-41, wherein receiving the GUI view data comprises: receiving, by a higher power processor of the mobile computing device from a GUI view data provider, the GUI view data; and receiving, by a lower power processor of the mobile computing device from the higher power processor, the GUI view data.

Example 43: A mobile computing device includes at least one processor; and a computer-readable storage device configured to store instructions that are executable by the at least one processor to: receive graphical user interface (GUI) view data associated with a GUI view; generate platform-specific instructions for generating the GUI view based at least in part on the GUI view data; and execute the platform-specific instructions to output, for display, the GUI view.

Example 44: The mobile computing device of example 43 wherein the at least one processor includes at least a lower power processor.

Example 45: The mobile computing device of any of examples 43 and 44, wherein the instructions stored on the computer-readable storage device are further executable by the at least one processor to perform the method of any of examples 22-42.

Example 46: A mobile computing device comprising one or more means for performing the method of any combination of examples 21-42.

Example 47: A computer-readable storage medium having stored thereon instructions that, when executed, cause one or more processors to: receive graphical user interface (GUI) view data associated with a GUI view; generate platform-specific instructions for generating the GUI view based at least in part on the GUI view data; and execute the platform-specific instructions to output, for display, the GUI view.

Example 48: A computer-readable storage medium having stored thereon instructions that, when executed, cause one or more processors to perform the method of any combination of examples 21-42.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of intraoperative hardware units, including one or more processors as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
receiving, by one or more processors of a mobile computing device from a view provider, graphical user interface (GUI) view data that specifies, for each respective GUI view of a set of GUI views, a respective platform-neutral layout description and a respective one or more condition for the respective GUI view to be a relevant GUI view, wherein the respective one or more conditions comprise one or more of time-based conditions, location-based conditions, or user activity-based conditions;
in response to determining that contextual information associated with at least one of the mobile computing device or a surrounding environment matches one or more conditions for a GUI view of the set of GUI views specified by the GUI view data, determining, by the one or more processors, the GUI view as the relevant GUI view out of the set of GUI views; and
in response to determining the GUI view as the relevant GUI view, outputting, by the one or more processors and based at least in part on a platform-neutral layout description for the GUI view specified by the GUI view data, the GUI view for display at a display device.

2. The method of claim 1, further comprising:
in response to receiving the GUI view data, caching, by the one or more processors, the GUI view data in memory;
determining, by the one or more processors, a second GUI view as the relevant GUI view out of the set of GUI views based at least in part on one or more conditions for the second GUI view specified by the GUI view data cached in the memory; and
in response to determining the second GUI view as the relevant GUI view, outputting, by the one or more processors and based at least in part on a platform-neutral layout description for the second GUI view specified by the GUI view data cached in the memory, the second GUI view for display at the display device.

3. The method of claim 2, further comprising:
determining, by the one or more processors, that the GUI view is no longer the relevant GUI view out of the set of GUI views based at least in part on the one or more conditions for the GUI view specified by the GUI view data; and
in response to determining that the GUI view is no longer the relevant GUI view, ceasing, by the one or more processors, to output the GUI view for display at the display device.

4. The method of claim 3, wherein:
the one or more conditions for the second GUI view and the one or more conditions for the second GUI view is each associated with one or more of: a time period, a location, or an activity; and
determining the second GUI view as the relevant GUI view out of the set of GUI views based at least in part on the one or more conditions for the second GUI view further comprises determining, by the one or more processors, that contextual information associated with the mobile computing device matches the one or more conditions associated with the second GUI view.

5. The method of claim 2, wherein outputting the second GUI view comprises outputting one or more resources specified by the GUI view data as one or more user interface (UI) elements of the second GUI view, including:

in response to receiving user input that corresponds to user interaction with an UI element of the second GUI view, performing, by the one or more processors, an action associated with the UI element as specified by the GUI view data.

6. The method of claim 5, wherein the action is accessing a deep link to a native application that executes at the mobile computing device.

7. The method of claim 2, wherein the GUI view data specifies one or more resources associated with the second GUI view, wherein the one or more resources are not bundled in the GUI view data, and wherein outputting the second GUI view for display at the display device further comprises:
retrieving, by the one or more processors, the one or more resources; and
outputting, by the one or more processors, the one or more resources associated with the second GUI view for display at the display device.

8. The method of claim 7, wherein:
retrieving the one or more resources further comprises in response to determining that the GUI view data specifies the one or more resources associated with the second GUI view, determining, based at least in part on one or more resource versions associated with the one or more resources, that the one or more resources are cached in a resource cache of the mobile computing device; and
outputting the one or more resources associated with the second GUI view further comprises outputting, by the one or more processors, the one or more resources cached in the resource cache for display at the display device.

9. The method of claim 7, wherein:
the one or more resources comprise a plurality of resources associated with the second GUI view;
retrieving the one or more resources further comprises in response to determining that the GUI view data specifies the plurality of resources associated with the second GUI view, sending, by the one or more processors to a resource provider, a respective request for each respective resource of the plurality of resources; and
outputting the GUI view including the one or more resources for display at the display device further includes in response to receiving a resource of the plurality of resources from the resource provider, outputting, by the one or more processors, the resource for display at the display device.

10. The method of claim 9, wherein the resource is a bitmap image, and wherein outputting the resource for display at the display device further comprises:
performing, by the one or more processors, a direct memory access of the resource from a processor cache of the one or more processors, into a screen buffer of the display device to output the resource for display at the display device.

11. The method of claim 1, wherein:
the mobile computing device includes both a higher power processor and a lower power processor, wherein the lower power processor is configured to consume less power than the higher power processor; and
outputting, based at least in part on the platform-neutral layout description for the GUI view specified by the GUI view data, the GUI view for display at the display device further comprises:
generating, by a renderer executing on the lower power processor of the mobile computing device and based on the platform-neutral layout description for the GUI view specified by the GUI view data, native instructions for the lower power processor to generate the GUI view; and
executing, by the lower power processor, the native instructions to output the GUI view for display at the display device.

12. A mobile computing device, comprising:
at least one processor; and
a computer-readable storage device configured to store instructions that are executable by the at least one processor to:
receive, from a view provider, graphical user interface (GUI) view data that specifies, for each respective GUI view of a set of GUI views, a respective platform-neutral layout description and a respective one or more condition for the respective GUI view to be a relevant GUI view, wherein the respective one or more conditions comprise one or more of time-based conditions, location-based conditions, or user activity-based conditions;
in response to determining that contextual information associated with at least one of the mobile computing device or a surrounding environment matches one or more conditions for a GUI view of the set of GUI views specified by the GUI view data, determine the GUI view as the relevant GUI view out of the set of GUI views; and
in response to determining the GUI view as the relevant GUI view, output, based at least in part on a platform-neutral layout description for the GUI view specified by the GUI view data, the GUI view for display at a display device.

13. The mobile computing device of claim 12, wherein the instructions are further executable by the at least one processor to:
in response to receiving the GUI view data, cache the GUI view data in memory;
determine a second GUI view as the relevant GUI view out of the set of GUI views based at least in part on one or more conditions for the second GUI view specified by the GUI view data cached in the memory; and
in response to determining the second GUI view as the relevant GUI view, output, based at least in part on a platform-neutral layout description for the second GUI view specified by the GUI view data cached in the memory, the second GUI view for display at the display device.

14. The mobile computing device of claim 13, wherein:
the one or more conditions for the second GUI view and the one or more conditions for the second GUI view is each associated with one or more of: a time period, a location, or an activity; and
the instructions that are executable by the at least one processor to determine the second GUI view as the relevant GUI view out of the set of GUI views based at least in part on the one or more conditions for the second GUI view are further executable by the at least one processor to determine that contextual information associated with the mobile computing device matches the one or more conditions associated with the second GUI view.

15. The mobile computing device of claim 13, wherein:
the instructions that are executable by the at least one processor to output the second GUI view are further executable by the at least one processor to output one or more resources specified by the GUI view data as associated with one or more user interface (UI) elements of the second GUI view, including:

in response to receiving user input that corresponds to user interaction with an UI element of the second GUI view, performing an action associated with the UI element as specified by the GUI view data.

16. The mobile computing device of claim 13, wherein:

the GUI view data specifies one or more resources associated with the second GUI view;

the one or more resources are not bundled in the GUI view data; and the instructions that are executable by the at least one processor to output the second GUI view for display at the display device are further executable by the at least one processor to:

retrieve the one or more resources; and output the one or more resources associated with the second GUI view for display at the display device.

17. The mobile computing device of claim 16, wherein:

the instructions that are executable by the at least one processor to retrieve the one or more resources are further executable by the at least one processor to, in response to determining that the GUI view data specifies the one or more resources associated with the second GUI view, determine, based at least in part on one or more resource versions associated with the one or more resources, that the one or more resources are cached in a resource cache of the mobile computing device; and the instructions that are executable by the at least one processor to output the one or more resources associated with the second GUI view are further executable by the at least one processor to output the one or more resources cached in the resource cache for display at the display device.

18. The mobile computing device of claim 16, wherein:

the one or more resources comprise a plurality of resources associated with the second GUI view;

the instructions that are executable by the at least one processor to retrieve the one or more resources are further executable by the at least one processor to, in response to determining that the GUI view data specifies the plurality of resources associated with the second GUI view, send, to a resource provider, a respective request for each respective resource of the plurality of resources; and the instructions that are executable by the at least one processor to output the GUI view including the one or more resources for display at the display device are further executable by the at least one processor to, in response to receiving a resource of the plurality of resources from the resource provider, output the resource for display at the display device.

19. The mobile computing device of claim 18, wherein:

the resource is a bitmap image; and the instructions that are executable by the at least one processor to output the resource for display at the display device are further executable by the at least one processor to perform a direct memory access of the resource from a processor cache of the at least one processor into a screen buffer of the display device to output the resource for display at the display device.

20. A computer-readable storage medium having stored thereon instructions that, when executed, cause one or more processors of a mobile computing device to:

receive, from a view provider, graphical user interface (GUI) view data that specifies, for each respective GUI view of a set of GUI views, a respective platform-neutral layout description and a respective one or more condition for the respective GUI view to be a relevant GUI view, wherein the respective one or more conditions comprise one or more of time-based conditions, location-based conditions, or user activity-based conditions;

in response to determining that contextual information associated with at least one of the mobile computing device or a surrounding environment matches one or more conditions for a GUI view of the set of GUI views specified by the GUI view data, determine the GUI view as the relevant GUI view out of the set of GUI views; and in response to determining the GUI view as the relevant GUI view, output, based at least in part on a platform-neutral layout description for the GUI view specified by the GUI view data, the GUI view for display at a display device.

* * * * *